United States Patent
Waters et al.

(10) Patent No.: US 8,331,898 B2
(45) Date of Patent: Dec. 11, 2012

(54) POWER-SAVING RECEIVER CIRCUITS, SYSTEMS AND PROCESSES

(75) Inventors: Deric Wayne Waters, Dallas, TX (US); Karthik Ramasubramanian, Karnataka (IN); Arun Raghupathy, Karnataka (IN)

(73) Assignee: Texas Instruments Incorporated, Dallas, TX (US)

(*) Notice: Subject to any disclaimer, the term of this patent is extended or adjusted under 35 U.S.C. 154(b) by 989 days.

(21) Appl. No.: 12/244,060

(22) Filed: Oct. 2, 2008

(65) Prior Publication Data
US 2009/0168843 A1 Jul. 2, 2009

Related U.S. Application Data

(60) Provisional application No. 60/977,138, filed on Oct. 3, 2007.

(51) Int. Cl.
H04B 1/16 (2006.01)
(52) U.S. Cl. .................... 455/343.1; 455/323
(58) Field of Classification Search .......... 455/132–134, 455/313, 323, 334, 343.1
See application file for complete search history.

(56) References Cited

U.S. PATENT DOCUMENTS

| | | | |
|---|---|---|---|
| 5,185,610 A | 2/1993 | Ward et al. | |
| 5,774,829 A | 6/1998 | Cisneros et al. | |
| 5,781,156 A | 7/1998 | Krasner | |
| 5,841,396 A | 11/1998 | Krasner | |
| 5,874,914 A | 2/1999 | Krasner | |
| 5,945,944 A | 8/1999 | Krasner | |
| 5,999,124 A | 12/1999 | Sheynblat | |
| 6,002,363 A | 12/1999 | Krasner | |
| 6,018,704 A | 1/2000 | Kohli et al. | |
| 6,028,887 A | 2/2000 | Harrison et al. | |
| 6,133,871 A | 10/2000 | Krasner | |
| 6,148,042 A * | 11/2000 | Zehavi et al. | 375/340 |
| 6,466,561 B1 | 10/2002 | Lee et al. | |
| 6,480,557 B1 | 11/2002 | Rog et al. | |
| 6,917,331 B2 | 7/2005 | Gronemeyer | |
| 6,931,055 B1 | 8/2005 | Underbrink et al. | |
| 6,934,319 B2 | 8/2005 | Subramanian | |
| 6,934,630 B2 | 8/2005 | Linstrom et al. | |
| 7,010,061 B2 | 3/2006 | Subramanian | |
| 7,043,258 B2 | 5/2006 | Haddrell | |

(Continued)

FOREIGN PATENT DOCUMENTS
KR 10-0281082 B1 2/2001

OTHER PUBLICATIONS

"SIRF's Low Power Receiver Advances," by J. Knight, et al., Proceedings of the 11th International Technical Meeting of the Satellite Division of the Institute of Navigation ION GPS Sep. 15-18, 1998, Nashville TN, pp. 299-305, Figs. 1-2.

Primary Examiner — Nhan Le
(74) Attorney, Agent, or Firm — Wade J. Brady III; Frederick J. Telecky, Jr.

(57) ABSTRACT

An electronic circuit includes a receiver circuit (BSP) operable to perform coherent summations having a coherent summations time interval, and a power control circuit (2130) coupled to said receiver circuit (BSP) and operable to impress a power controlling duty cycle ($T_{ON}$, $T_{OFF}$) on the receiver circuit (BSP) inside the coherent summations time interval. Other circuits, devices, systems, methods of operation and processes of manufacture are also disclosed.

19 Claims, 17 Drawing Sheets

U.S. PATENT DOCUMENTS

| | | |
|---|---|---|
| 7,245,638 B2 | 7/2007 | Agazzi et al. |
| 2004/0252052 A1 | 12/2004 | Kitatani |
| 2005/0192032 A1 | 9/2005 | Onggosanusi et al. |
| 2005/0232196 A1 | 10/2005 | Joshi et al. |
| 2005/0275587 A1 | 12/2005 | Siegel et al. |
| 2007/0120734 A1 | 5/2007 | Salkhi |
| 2007/0263981 A1 | 11/2007 | Ueno et al. |
| 2008/0065326 A1 | 3/2008 | Hoashi |

\* cited by examiner

POWER-SAVING RECEIVER CIRCUITS, SYSTEMS AND PROCESSES

CROSS-REFERENCES TO RELATED APPLICATIONS

This application claims the benefit under 35 U.S.C. 119(e) of U.S. Provisional Application No. 60/977,138 (TI-65435PS) entitled "Novel Power-Save Mode for Accumulate-and-Dump Receivers" filed on Oct. 3, 2007, and which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

GPS (Global Positioning System) is an earth-satellite-based electronic system for enabling GPS receivers in ships, aircraft, land vehicles and land stations to determine their geographic and spatial position such as in latitude, longitude, and altitude. Discussion of GPS herein is without limitation to other analogous electronic systems as well as applicable receiver circuits in a variety of telecommunication systems.

Reducing power consumption in communication devices is of considerable importance.

It would be desirable to accurately, reliably, conveniently and economically maintain accurate time, position, velocity, and/or acceleration estimation and yet save power in a communication device having a satellite positioning receiver (SPR) or other receiver and its clock source.

Reducing device and system power dissipation without compromising performance are important goals in receivers, microprocessors such as digital signal processors (DSPs), RISC processors and other processors, integrated circuits and software generally and system-on-a-chip (SOC) and other system design. These goals are especially important in hand held/mobile applications where small size is so important, to control the cost and the power consumed while achieving excellent performance.

SUMMARY OF THE INVENTION

Generally and in one form of the invention, an electronic circuit includes a receiver circuit operable to perform coherent summations having a coherent summations time interval, and a power control circuit coupled to said receiver circuit and operable to impress a power controlling duty cycle on the receiver circuit inside the coherent summations time interval.

Generally, another form of the invention involves a power management circuit for controlling a process having a maximum available interval for coherent summations. The power management circuit includes a power gating circuit operable to turn power on and off to at least one portion of the process, and a control circuit operable to establish a rate of turning the power on and off by said power gating circuit that equals or exceeds the reciprocal of the maximum available interval for coherent summations.

Generally, a method form of the invention involves a method of operating a receiver circuit having coherent summations during a coherent summations time interval. The method includes impressing a power controlling duty cycle on the receiver circuit inside the coherent summations time interval.

Generally, a further form of the invention is a telecommunications device including a spread spectrum receiver circuit operable to perform coherent summations having a coherent summations time interval, and a power control circuit coupled to said receiver circuit and operable to impress a power controlling duty cycle on the spread spectrum receiver circuit inside the coherent summations time interval.

Generally, a process of manufacturing according to the invention includes fabricating as an integrated circuit on a wafer a receiver circuit for coherent summations having a coherent summations time interval and a power control circuit to impress a power controlling duty cycle on the receiver circuit inside the coherent summations time interval.

Other circuits, devices, systems, methods of operation and processes of manufacture are also disclosed and claimed.

Corresponding numerals in different Figures indicate corresponding parts except where the context indicates otherwise (e.g., see letters A and B). A minor variation in capitalization or punctuation for the same thing does not necessarily indicate a different thing. A suffix .i or .j refers to any of decimally suffixed elements having the same numeral prefix.

DETAILED DESCRIPTION OF EMBODIMENTS

Power-saving accumulate-and-dump (AD) receiver circuits, systems and processes of operation in manufacture are disclosed. AD receivers accumulate an incoming signal in order to boost the signal-to-noise ratio (SNR) of the signal. The accumulation may be coherent or non-coherent or both. AD receivers are suitably used in GPS and modernized GPS reception, and code-division multiple-access (CDMA) cellular communications and other systems.

Figure 1:
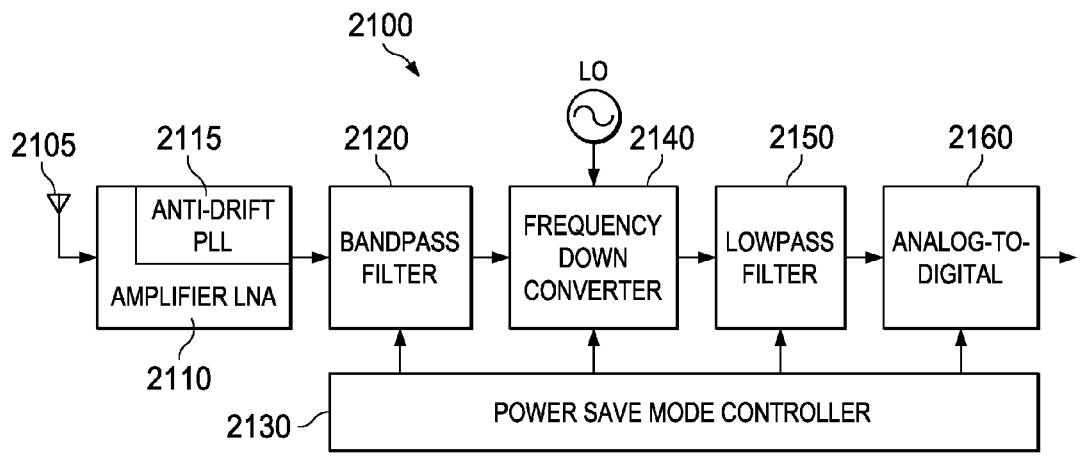
FIG. 1 is a block diagram for an RF front end of an inventive accumulate-and-dump (AD) receiver of FIG. 2 with inventive power saving mode controller.

In FIG. 1, the receiver converts the incoming signal to a digital baseband signal using a radio-frequency (RF) front end 2100 coupled to one or more antennas 2105. The RF front end 2100 has a low noise amplifier LNA 2110 and an associated anti-drift PLL 2115. LNA 2110 is coupled to a bandpass filter 2120 that in turn feeds a frequency downconverter 2140. The frequency down-converter 2140 has a local oscillator LO and a mixer followed by a low pass filter 2150 and an analog-to-digital (A/D) converter 2160. A power saving mode controller 2130 selectively supplies power to any one, some, part or all of bandpass filter 2120, frequency down converter 2140, low pass filter 2150 and A/D converter 2160. Controller 2130 supplies power independently to LNA 2110, anti-drift PLL 2115 and the local oscillator LO in case these blocks are lower cost units with enough warm up drift to justify keeping them powered continually except in a longer-term sleep mode.

Figure 2:
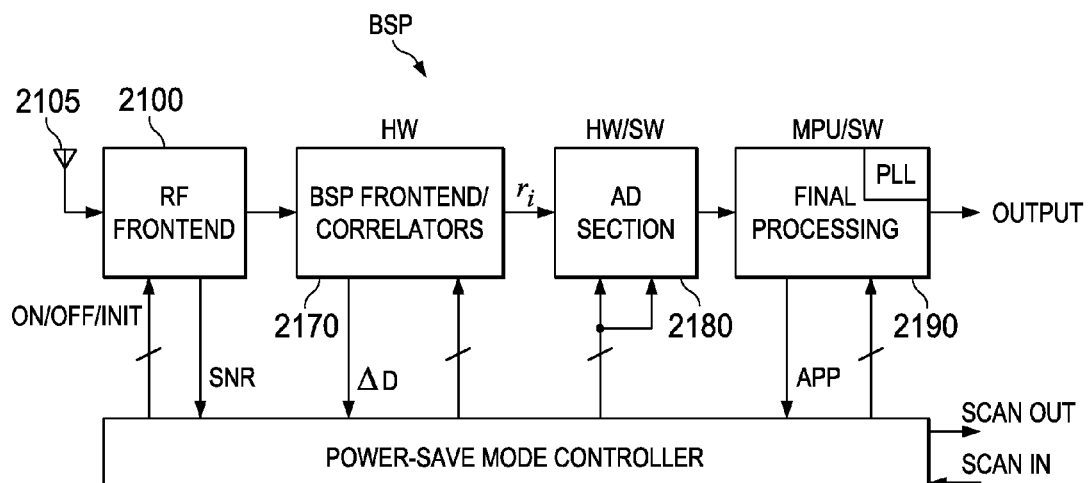
FIG. 2 is a block diagram of an inventive AD receiver with power saving mode controller and blocks of a baseband signal processor (BSP).

In FIG. 2, RF front end 2100 delivers a baseband signal in digital form to a baseband signal processor BSP, such as a microprocessor MPU with software SW and/or other integrated circuit(s) of FIG. 3A, 3B, 13, 14, 15 or 17. The BSP has a DSP front end 2170 including correlators (see also FIGS. 3B and 7) that deliver a received signal $r_i$ to an accumulate-and-dump AD section 2180 followed by a block for final processing 2190 with its own phase lock loop PLL. In some embodiments, the correlators in block 2170 are implemented in high-speed hardware, and the AD section 2180 is provided using a combination of hardware and software.

In FIGS. 1 and 2, a Power-Save Mode Controller 2130 reduces power consumption by turning off one or more of the system components in the RF front end 2100 and/or the BSP temporarily and repeatedly. In FIG. 2, the Power-Save Mode Controller 2130 selectively supplies power to RF front end 2100 as in FIG. 1 and to DSP front end 2170, AD section 2180 and final processing 2190. Power-Save Mode Controller 2130 is responsive, for example, to any one, some or all of signal-to-noise ratio $SNR_i$ estimated in BSP front-end 2170 for one or more received signals, Doppler D and/or Doppler difference ΔD from BSP front end 2170, and application parameters, application modes and/or application types being run by MPU 2190. Example flows for structure and processes for Power-Save Mode Controller 2130 are shown in FIGS. 10, 11, 11A, and 12 described later hereinbelow with reference to power waveforms of FIGS. 4B-6D.

Figure 17:
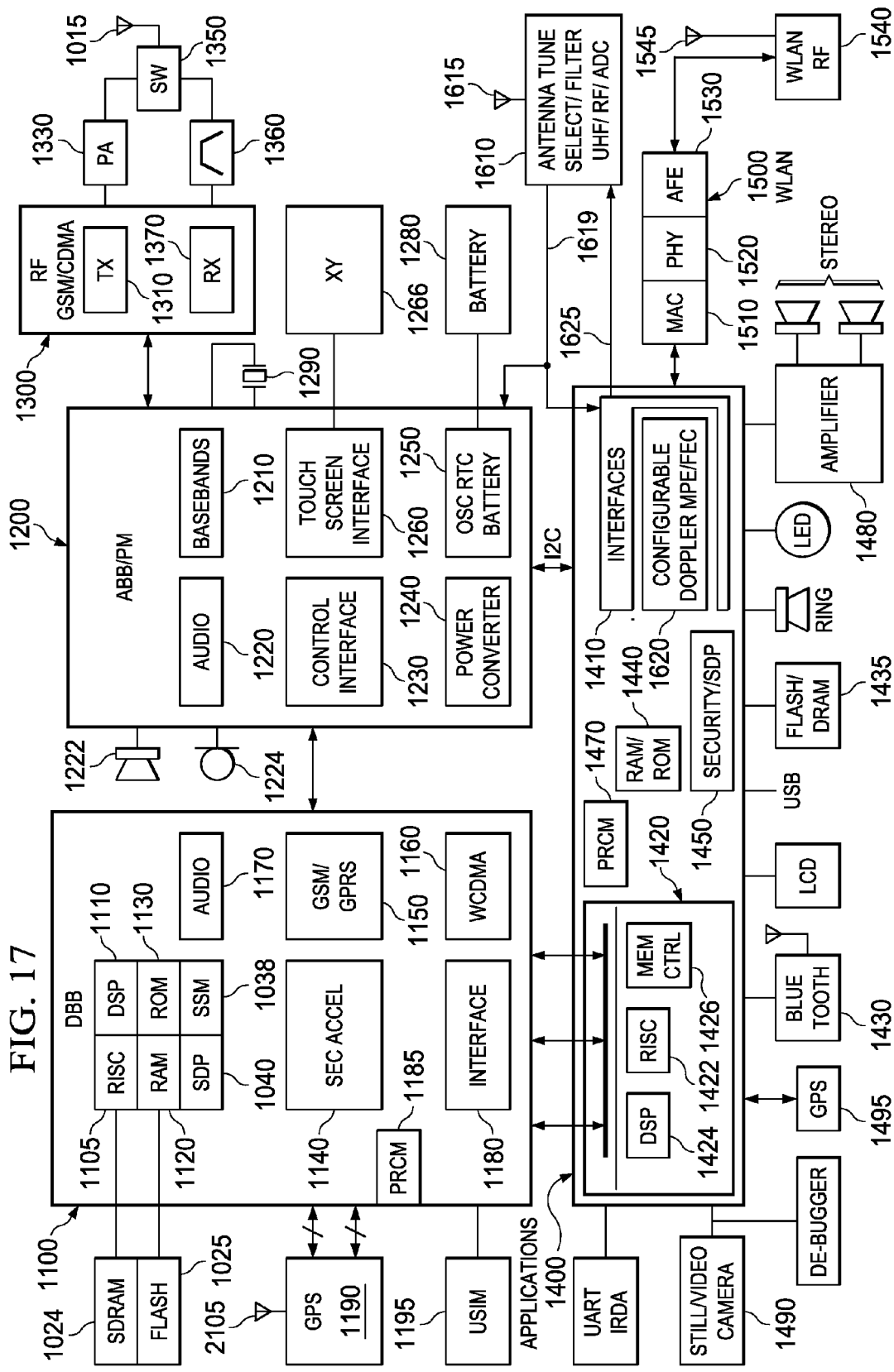
FIG. 17 is a block diagram of inventive integrated circuit chips for use in the blocks of the communications system of FIG. 16, including an inventive partitioning of circuit blocks of a cellular telephone handset according to FIG. 14 or FIG. 15.

The Power Save Mode Controller 2130 has Scan In and Scan Out paths for serial scan testability and verification with a Debugger of FIG. 17. A scan path is coupled to a JTAG 1149.1 or 1149.7 test access port (TAP) controller circuit or otherwise in the system embodiment that supports such testability, and the TAP controller is coupled to the Debugger at test time. Other scannable blocks in FIGS. 1 and 2 are also included in the scan chain as desired.

A variety of embodiments are provided for spread-spectrum communications systems at base stations, gateways, handsets, and any applicable devices for mobile, portable, and/or fixed use. Such systems suitably support any one or more of global positioning system GPS and other location-determining or positioning systems, cellular voice and data, code division multiple access CDMA, wireless local area network WLAN, industrial, scientific, and medical communications, cordless telephones, and any other spread-spectrum communications systems. A somewhat overlapping category of embodiments are provided for receivers employing coherent signal accumulation in spread-spectrum or other types of communications systems.

One category of embodiments involves GPS receivers. GPS satellites transmit time of transmission, satellite clock correction parameters and ephemeris data. The spread spectrum transmissions of GPS have either of two microwave carrier frequencies (above 1 GHz). The modulation involves two pseudorandom noise PN code types—a high-rate Precision P code and a lower rate one-millisecond period C/A (Coarse/Acquisition) code. C/A is discussed here without limitation. Each PN code type has various possible orthogonal sequences, and a particular unique PN sequence is assigned to each satellite.

In FIGS. 1, 2, 3A, 3B a receiver finds satellites by locally generating different PN sequences and electronically correlating or synchronizing them with each unique PN sequence assigned to receptions from available satellites. In the receiver processing, Doppler frequency removal is performed for each satellite ahead of the correlating, so that higher correlations can be found. The receiver monitors for high correlations to individually receive (and distinguish) satellite signals of different satellites from each other. The information data modulated on a given received satellite signal then is demodulated to obtain the information, including the time of transmission, satellite clock correction parameters and ephemeris data. This information comes modulated on the unique PN sequence from the satellite as binary phase shift keyed BPSK (+1/−1) data bits that are repeated for signal-enhancing accumulation in the AD receiver (e.g., in blocks 2180, 2260, 2310).

Figure 9A:
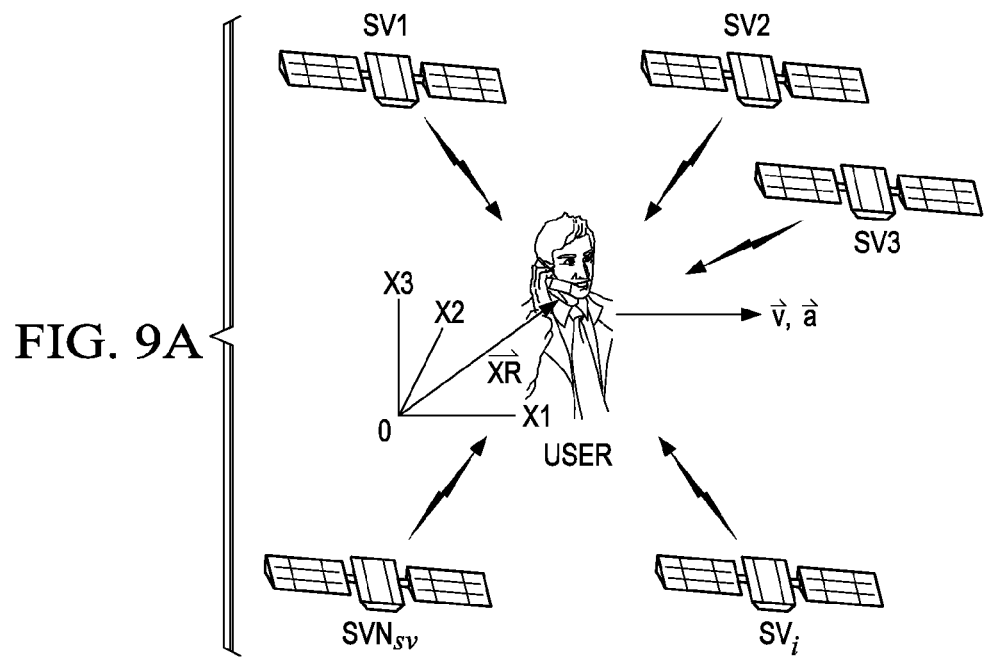
FIG. 9A is a pictorial diagram of orbiting positioning satellites and a handset system for receiving satellite transmissions and cellular network signals.

The receiver tracks four or more satellites (FIG. 9A), recovers the transmitted information from each of them, and operates a microprocessor (e.g. 2190, 2270, 2320, or 2370) to solve navigation equations to yield the position $X_R$ of the receiver in FIG. 9A for user applications involving position on and above the surface of the earth. A simple example of navigation equations in three position coordinates x indexed i=1, 2, 3 that are simultaneously solved based on signals from satellites $SV_j$ (=1, 2, 3, 4, . . . ) is given in rectangular coordinates by $$\sum_{i=1}^{3}(x_{ij}-x_{iR})^2 = c^2((t_{Rj}+e)-t_j)^2$$

In words, the equation says that the square of the distance from the satellite to the receiver is equal to the square of the product of the speed of light times the propagation time to traverse the distance. Parameters $x_{ij}$ represent each (known) coordinate position i of satellite j communicated by the ephemeris data. Variables $x_{iR}$ represent each (unknown) coordinate position i of the receiver itself. Time $t_j$ is the time of transmission from satellite j received with the data signal and corresponding to receiver R local time $t_{Rj}$ (adjusted to the autocorrelation peak). The receiver local time has a bias error e relative to the atomic time base of the GPS system, so the GPS time at the receiver is $t_{Rj}$+e. Speed of light c times the GPS time difference between transmission and reception is expressed by $c(t_{Rj}+e)-t_j$ and equals the distance to the satellite j. In spherical coordinates, the three parameters $x_{ij}$ and the three variables $X_{iR}$ in the navigation equations are each replaced by a trio of expressions r cos θ cos φ, r cos θ sin φ, r sin θ appropriately subscripted and with a summation over the three coordinates explicitly written out.

The known carrier frequency from each satellite is, in general, Doppler shifted by a different amount. The microprocessor solves Doppler equations to determine the velocity $V_R$ of the receiver in FIG. 9A for user applications that involve velocity. Some receivers also determine the acceleration a for the receiver. Some receivers have multiple antennas and multiple circuits that additionally determine physical orientation or attitude in terms of roll, pitch, and yaw.

Figure 3A:
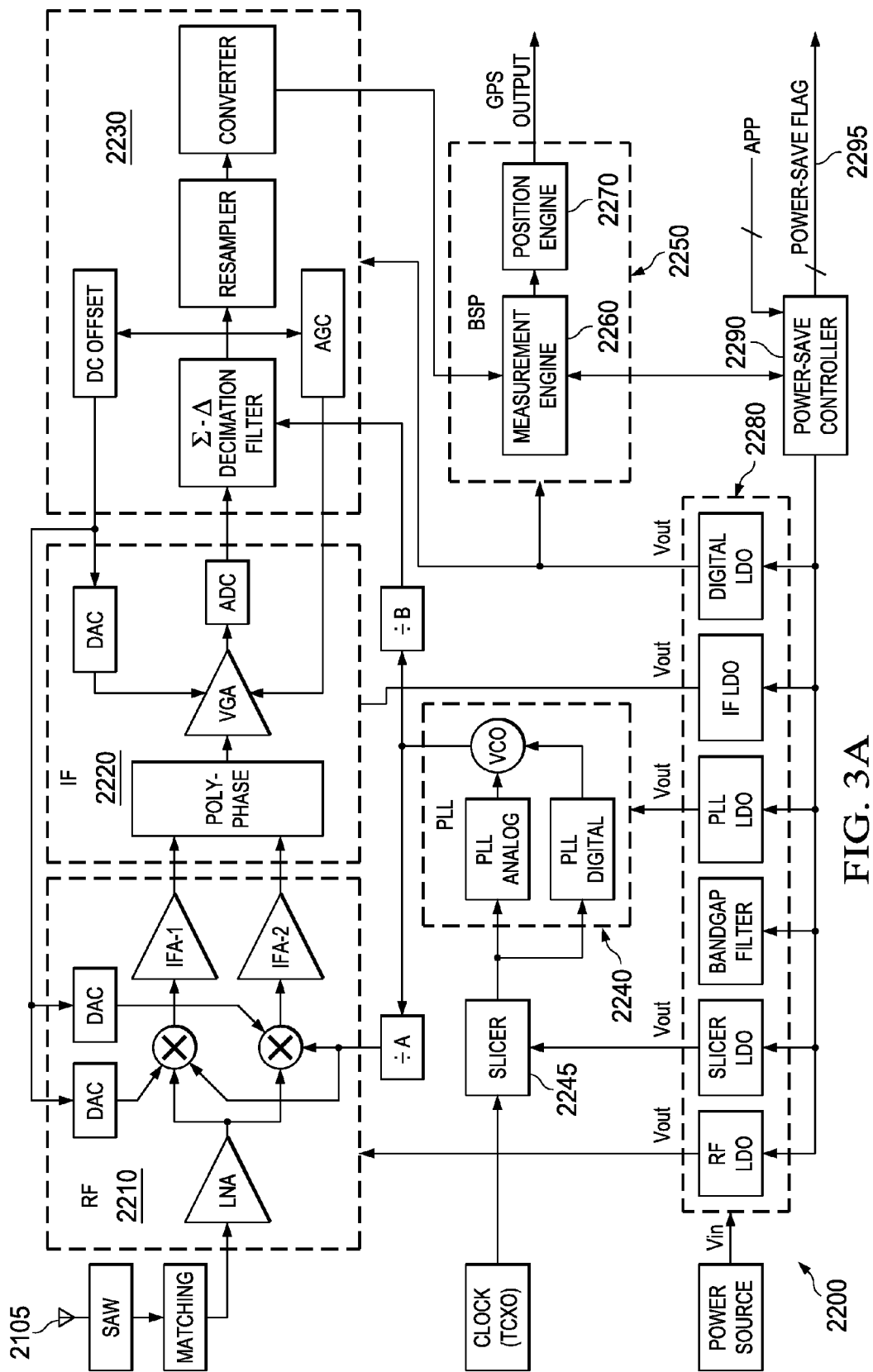
FIG. 3A is a more detailed block diagram of an inventive AD receiver with inventive power save controller.

FIG. 3A shows a GPS receiver 2200 embodiment including a BSP 2250 having a Measurement Engine 2260 feeding a Position Engine 2270. Position Engine 2270 refers to functions of or operations in the Baseband processor BSP that are run on a host processor and/or on a dedicated microprocessor and Position Engine 2270 supplies GPS output. Measurement Engine 2260 is coupled to and fed by a Digital Frontend 2230. Measurement Engine 2260 includes functions or operations of the GPS chip running on the ASIC hardware of FIG. 14 or on the dedicated microprocessor of FIG. 15. A power-save controller 2290 controls a voltage supply 2280 for five main blocks: RF 2210, IF 2220, Digital Frontend 2230, PLL 2240 fed by a clock circuit having a temperature compensated crystal oscillator TCXO as time base via a power controlled clock slicer 2245, and BSP 2250. Voltage supply 2280 supplies and regulates power voltage to the power gating circuitry (e.g., gating FETs in the supply voltage lines to power managed blocks) controlled by Power-Save Controller 2290.

The power-save controller 2290 is connected directly to any of the other individual components to turn them on/off directly as shown by a connection from the power-save controller 2290 to the Measurement Engine 2260, for instance. Power connections and/or power controlling enables are provided as shown in FIGS. 1 and 2 or otherwise to any appropriate block or components in each block of FIGS. 3A, 3B whether or not explicitly or completely shown in FIGS. 3A, 3B. Power-save controller 2290 is coupled by Digital LDO, or otherwise, to the power source in a way that keeps some or all of power-save controller 2290 operable and active to deliver power control duty cycles and power control enable and disable signals to power-controlled blocks of receiver 2200.

Thus, the power management circuit has a power gating circuit and a control circuit. The control circuit establishes the rate and duty cycle of turning the power on and off by the power gating circuit. In some embodiments, the power gating circuit has a configurable counter circuit and a control circuit configures the power gating circuit. In some embodiments, power is gated by at least part of the power gating circuit to the control circuit itself, so the control circuit can be powered down while the configurable power gating circuit for one or more control blocks operates autonomously. In some embodiments, the receiver process and/or structure has plural portions and the power gating circuit is operable to turn power on and off to different portions at different times.

In FIG. 3A, antenna 2105 is coupled to RF section 2210 via a surface acoustic wave (SAW) bandpass filter and matching network for LNA to dual mixers and intermediate frequency IF amplifiers IFA-1 and IFA-2. The IF amplifiers feed a polyphase combining and noise-reducing block that supplies signal to a variable gain amplifier VGA in IF section 2220. An ADC converts IF output to digital form for digital front end 2230 where a Sigma-Delta decimation filter provides output for use establishing automatic gain control AGC for VGA and establishing DC offset estimation for respective DACs (digital to analog convertors) connected to VGA in IF 2220 and to the dual mixers in RF 2210 respectively. In digital front end 2230, a Resampler is responsive to the Sigma-Delta decimation filter and in turn provides output to a baseband converter that feeds baseband signal to baseband signal processor BSP 2250.

In FIG. 3A, phase lock loop PLL 2240 has a clock multiplying voltage controlled oscillator VCO coupled with a PLL digital block and PLL analog block fed by slicer 2245. The VCO supplies local oscillator LO via a divide-by-A block to the dual mixers in RF section 2210. VCO also drives a divide-by-B block to provide a different sampling clock to the Sigma-Delta Decimation Filter in digital front end 2230. For instance, the division parameters suitably are A=2 (two) and B=12 (twelve).

Voltage supply block 2280 has a power source, such as a battery, or other suitable power source. Under control of power save controller 2290, voltage supply block 2280 has a low dropout regulator LDO for powering the RF section 2210, an LDO for powering slicer 2245, an LDO for powering PLL 2240, an LDO for supplying IF section 2220, and an LDO for supplying digital front end 2230 and BSP 2250. Power save controller 2290 has power save flag line(s) 2295 coupled to the external system of FIG. 3B. Line(s) 2295 are described later hereinbelow in connection with FIGS. 10-12.

Figure 3B:
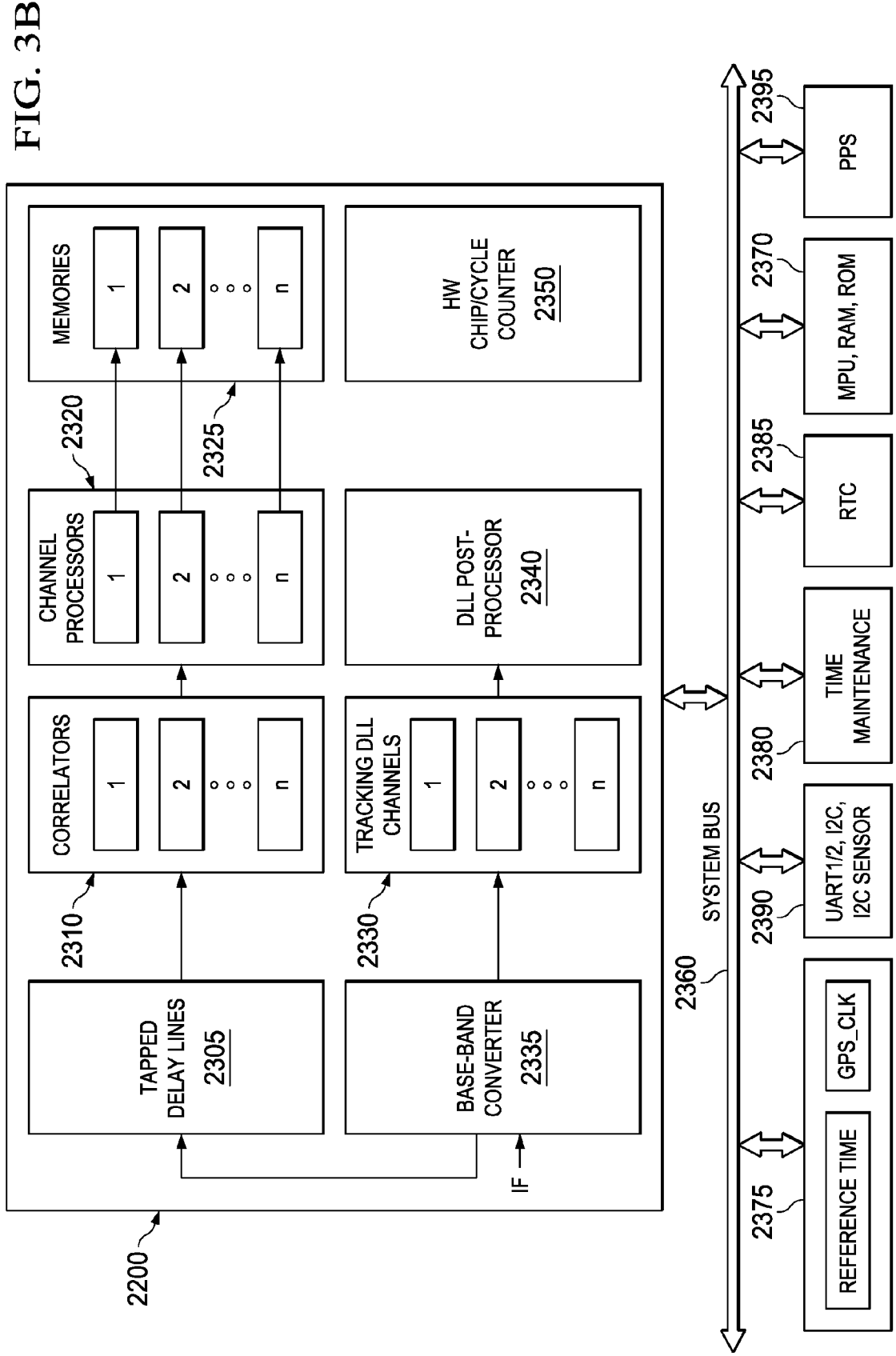
FIG. 3B is a block diagram of an inventive system with part of the inventive AD receiver of FIG. 3A.

FIG. 3B is read together with FIG. 3A. In FIG. 3B, the baseband converter 2335 in digital front end 2230 of FIG. 3A feeds tapped delay lines 2305 that go to a fast correlation engine 2310 having a set of parallel Correlators (multiply-add channel filters) 2310 that are equal in number, for instance to the number of milliseconds (e.g., 20) in a coherent summation interval. Recall that Doppler frequency removal or "wipe-off" has already occurred. The correlators each operate over a 1 ms characteristic PN sequence of a satellite and multiply-add by a locally selected and generated PN sequence from the receiver's stored set of mutually-orthogonal PN sequences to despread a spread-spectrum satellite signal when the generated PN sequence is properly time-shifted to synchronize with the characteristic PN sequence received from the satellite. A corresponding number of Channel Processors 2320 are provided to process the output of the correlators 2310, identify a peak when a locally generated PN sequence is successfully de-spreaded by a correlator and obtain GPS information from acquired satellites. De-spreaded modulation is coherently accumulated and dumped to memory to increase the signal to noise ratio, see also FIG. 7. A block of memory 2325 in FIG. 3B provides a number of memory sections for each of the Channel Processors 2320 and for noncoherent summation results. In this way, the cumulated information from coherent and noncoherent summation is recorded and maintained. A hardware counter block 2350 counts chips and/or cycles and keeps time. ("Chips" here means or is related to PN spreading sequence bits per second as in FIGS. 3B, 6C, 6D, instead of referring to an integrated circuit chip as in FIGS. 14-17.) Also, counter block 2350 includes counters and registers and associated circuitry for configuring and establishing power management duty cycles as described elsewhere herein.

Further in FIG. 3B, the baseband converter 2335 in digital front end 2230 of FIG. 3A provides an output to a set of Tracking DLL channels 2330 that in turn supply output to a DLL postprocessor 2340. These channels are delay lock loop carrier tracking channels to accommodate an at-least-adequate number of satellites for the receiving purposes. The DLLs compute the time delay of the PN sequence and in the process can compute a quantity proportional to Doppler. Frequency lock loop(s) (FLL) are also suitably provided to get a more accurate estimate of the Doppler frequency by locking onto each available Doppler shifted satellite carrier signal and determining Doppler shift D and Doppler difference $\Delta D$ (delta-D) for each satellite that is acquired.

In a system aspect of FIG. 3B, a system bus 2360 couples the receiver 2200 to a microprocessor MPU 2370 and its associated memory RAM and ROM. The system also has a clock calibration block 2375 including a reference time counter and a GPS clock counter; and a time maintenance counter 2380, and a real-time clock counter 2385. Communications peripherals 2390 include first and second UARTs (parallel to serial interfaces also known as universal asynchronous receiver transmitter), a serial I2C interface and a sensor interface using serial I2C. The sensor interface suitably includes tilt sensors and/or accelerometer sensors for providing data by which MPU 2370 computes or augments GPS phase-tracking estimation of user kinematics. A PPS pulse-per-second generator 2395 is further connected via system bus 2360 with MPU 2370 and establishes precise one-second intervals.

An introductory description of a power saving process for power save controller 2290 of FIG. 3A is described, followed by a more detailed analysis. By way of introductory description, some forms of the power-save embodiments herein are applicable in some or many usage scenarios to reduce power consumption by more than 50%. The data-bit GPS information or other communications message of FIG. 4A can be decoded while the receiver 2200 operates in the power-save mode. Accuracy of measurement of user dynamics and kinematics is maintained, and any tendency towards degradation of accuracy is minimized and contained, in the power-save mode. Numerous variations and alternatives are comprehended in the process and structures for performing such power saving processes.

Various embodiments described herein are important because when the receiver components can be turned off and on in a matter of milliseconds or microseconds, for instance, the power saving can be large (on the order of 50%) such as in high SNR use cases during the time intervals that such use cases are applicable. Substantial power is saved in satellite positioning receivers that track carrier phase in connection with blocks 2330, 2340 or elsewhere as appropriate. Power savings are beneficial such as in real-time kinematics (RTK) applications for mobile phones with GPS very high positioning accuracy at personal scale. For such applications the power-save modes in some of the embodiments described herein (e.g., non-coherent, multiple sample power save mode, and coherent power save mode) are compatible with applications for tracking carrier phase of the satellite carrier signal itself because they support effectively-continual operation from the standpoint of the application while repeatedly turning power off and on for power management purposes. Coherent power save mode also supports recovery of every data bit in the transmission across each full second while gating power off during some redundant 1 ms portions during $T_{off}(i)$ in each 20 ms data bit interval, when SNR is adequate to permit this.

Unlike merely adjustable configuration of the coherent summation interval length in a communications system that might have the flexibility to permit such configurable length, some of the embodiments of structure and process are able to turn off power part of the time to receiver circuitry according to a power management duty cycle impressed on the coherent summation and thereby achieve valuable power savings. Thus, even in a system that has a specified fixed coherent summation interval (e.g., 20 ms) not readily subject to reconfiguration the power-savings are nevertheless achievable.

Moreover, the power saving modes embodiments herein facilitate time-extended and more sophisticated operation of position sensing circuitry without using more energy than circuitry lacking the power saving modes would use performing shorter-time and less-sophisticated operations of the same position sensing circuitry. For example, the circuitry can be more frequently operated to acquire updates to the satellite ephemeris data and use the updated data immediately instead of using old ephemeris data for parts of an hour, for instance. So different embodiments can have a variety of benefits including any one, some or all of extended battery life, more frequent updating of ephemeris, more frequent use of updated ephemeris, more sophisticated position sensing, location-based applications and more types of them, more accurate user kinematics applications, and other benefits.

Figure 4A:
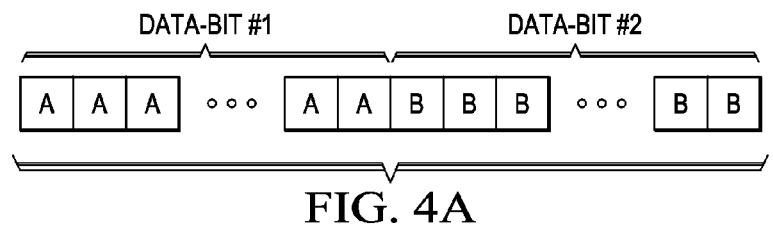
FIG. 4A is a diagram of received signal information versus time for an inventive AD receiver showing repetition of a symbol A followed by repetition of another symbol B.
Figure 6A:
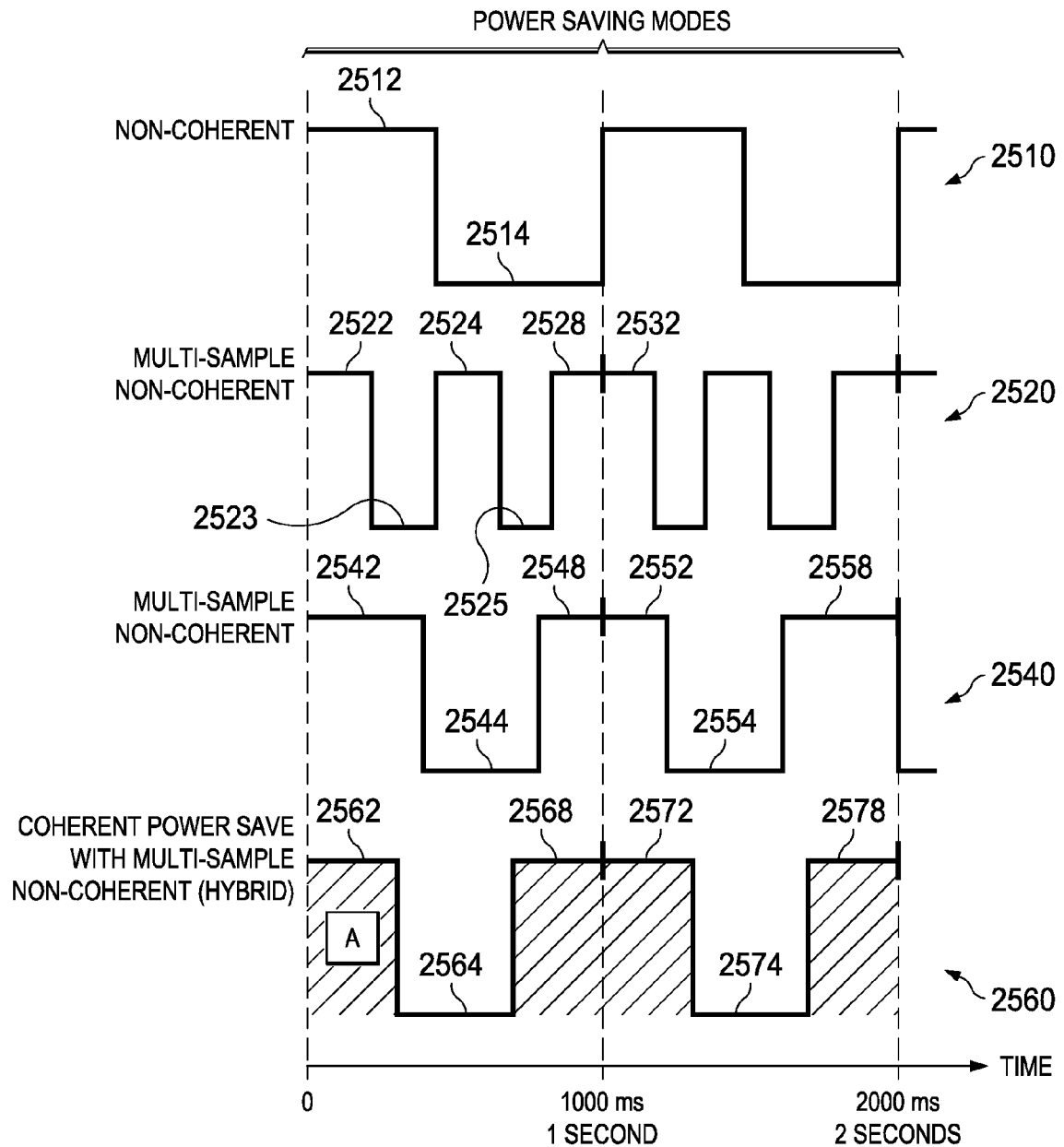
FIG. 6A is a collection of power versus time diagrams of different inventive power saving modes for the inventive AD receiver, the modes including Non-coherent, Multi-sample Non-coherent, Multi-sample Non-coherent, and Coherent Power Save with Multi-sample Non-coherent (Hybrid) power saving modes.
Figure 6B:
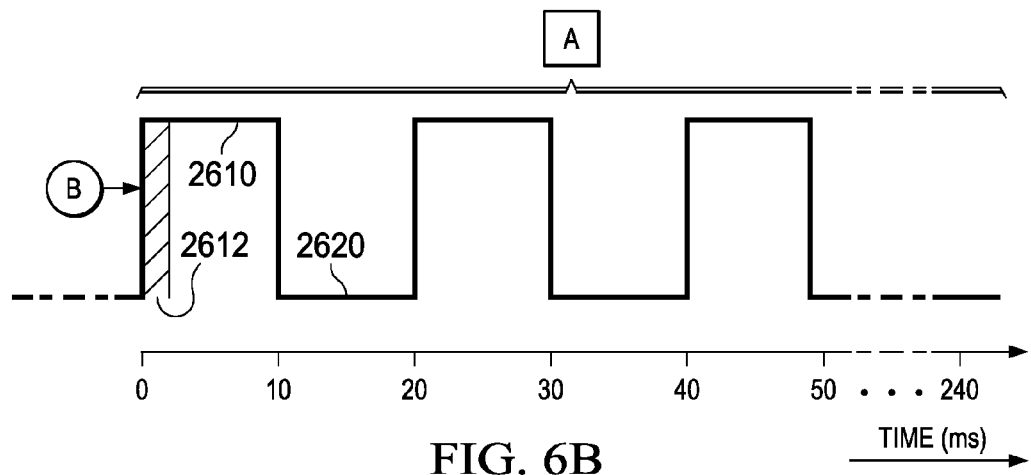
FIG. 6B is a power versus time diagram of the Coherent Power Save with Multi-sample Non-coherent (Hybrid) power saving mode with the time scale magnified relative to that of FIG. 6A.
Figure 6C:
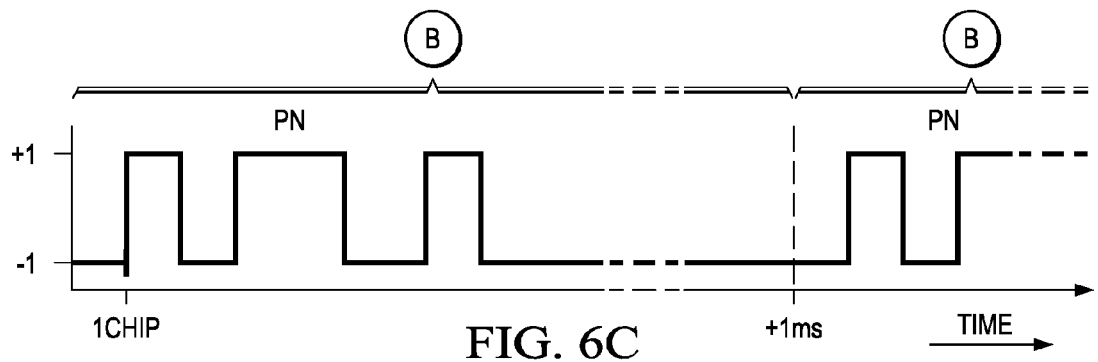
FIG. 6C is a power versus time diagram of the Coherent Power Save with Multi-sample Non-coherent (Hybrid) power saving mode with the time scale magnified relative to that of FIG. 6B showing a repeated pseudorandom noise (PN) sequence.

In FIGS. 4A and 6C, GPS satellites transmit CDMA signals each with a different and intended PN pseudo-noise sequence having a 1 ms repetition period, and with data modulated on top of the PN sequence at a rate of 50 Hz. Each data bit is transmitted 20 times in 20 ms. For example, in FIG. 4A and FIG. 6D, a data bit A is modulated on a 1 ms PN signal repeated 20 times, followed by a data bit B similarly repeated. Unintended noise (not shown, like wireless noise arriving in the propagation path, spread spectrum crosstalk, and receiver thermal noise) is impressed upon the signal in FIGS. 6C, 6D. This unintended noise is what is referred to as the "noise" in the metric of signal to noise ratio SNR.

The SNR is boosted by 13 dB (decibels) by adding the 20 repetitions of the signal coherently. $10 \log_{10}(20) = 13$ dB, as discussed in discussion of FIG. 8A. Coherent accumulation adds the signal arithmetically with number of repetitions while noise, being statistical, accumulates in rms (root-mean-square) value more slowly as the square root of the number of repetitions so that SNR is boosted.

Figure 7:
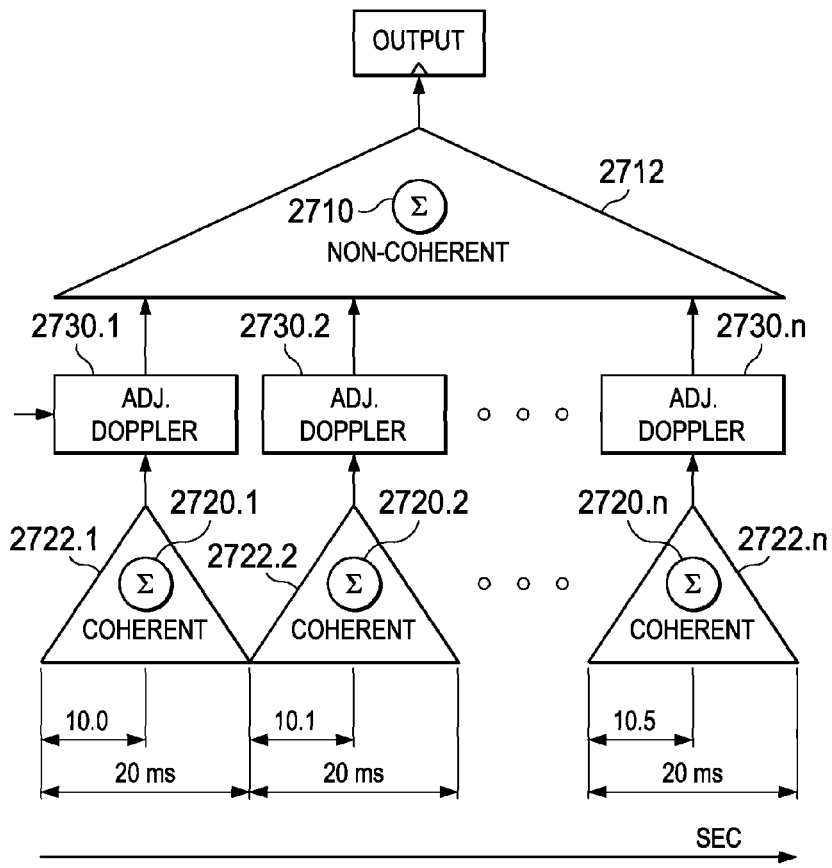
FIG. 7 is a block diagram of a set of coherent summing processes, Doppler adjustment blocks, and noncoherent summing process for an inventive AD receiver, and the block diagram is combined with triangles representing graphs of signal processing output versus time for the summing processes showing positions of autocorrelation peaks.

If the Measurement Engine 2260 output occurs at a rate of 1 Hz in FIG. 3A, the SNR can be boosted by an additional 15 dB by non-coherently adding or accumulating the repetitions of the GPS signal within a one second interval, as shown in FIG. 7. The total SNR boost is 28 dB (13 dB coherent+15 dB noncoherent) A receiver that coherently adds 20 repetitions of the signal, and then non-coherently adds or accumulates 50 signal repetitions represented in the 50 coherent summations (20 each), is denoted herein as a (20, 50) receiver.

Some of the embodiments can save power by controllably operating at less than 28 dB of SNR boost (or less than whatever particular maximum value is potentially deliverable by the electronics in a particular receiving system). A receiver has power save controller 2130 or 2290 controlling the duty cycle of power delivery to various receiver blocks. The receiver in some embodiments is put to sleep after non-coherently adding fewer than 50 coherent summations, In FIG. 4B, power voltage is applied to the receiver or relevant portion thereof during a period of time 2410 designated $T_{on}$. Power is removed in an off-transition 2420. Power is off during a period of time 2430, 2440 designated $T_{off}$. Power is again applied in a warm-up transition 2450 whereupon the cycle repeats.

The (20, 25) receiver is an example of a single-sample Non-coherent power save mode 2510 in FIG. 6A. In each time period of 1000 milliseconds, power is on during an interval 2512 and off during the remaining part 2514. Using various power save modes herein, some of the different kinds of receivers are more generally designated by the ordered pair (N, M), e.g. N=20, M=25.

In FIG. 6A, another type of power save mode that non-coherently adds fewer than all the potentially-available coherent summations, is called Multi-sample Non-coherent power save mode herein. One type of Multi-sample Non-coherent power save mode 2520 has two or more ON periods, such as 2522, 2524, 2528 separated by one or more OFF periods 2523, 2525. The operation in mode 2520 of the power save mode controller in each time period is identical to its operation in the successive time period, as illustrated by comparing ON interval 2532 with identical ON interval 2522.

Further in FIG. 6A, another Multi-sample Non-coherent power save mode 2540 of the power save mode controller in each time period is not identical to its operation in the successive time period, as illustrated by comparing ON interval 2552 with different ON interval 2542. This Multi-sample Non-coherent power save mode 2540 still has two or more ON periods, such as 2542, 2548 separated by one or more OFF periods 2544. In successive time periods, the operations of the power save mode controller are mirror images of each other in time.

Figure 4B:
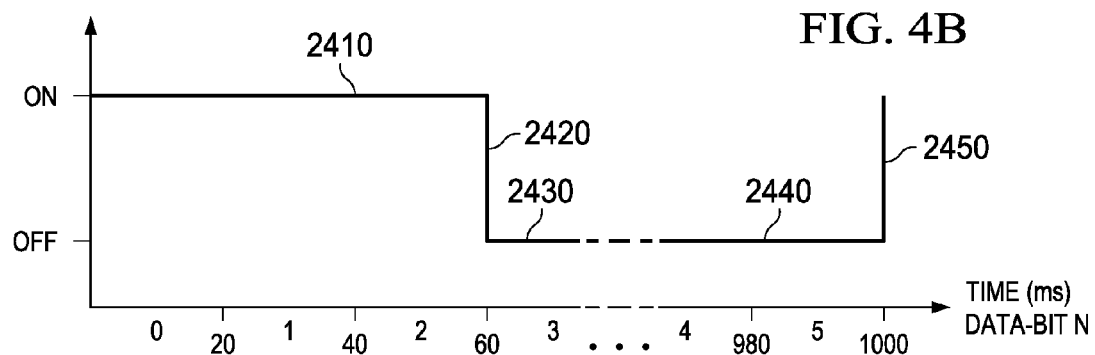
FIG. 4B is a power versus time diagram for an inventive AD receiver.
Figure 4C:
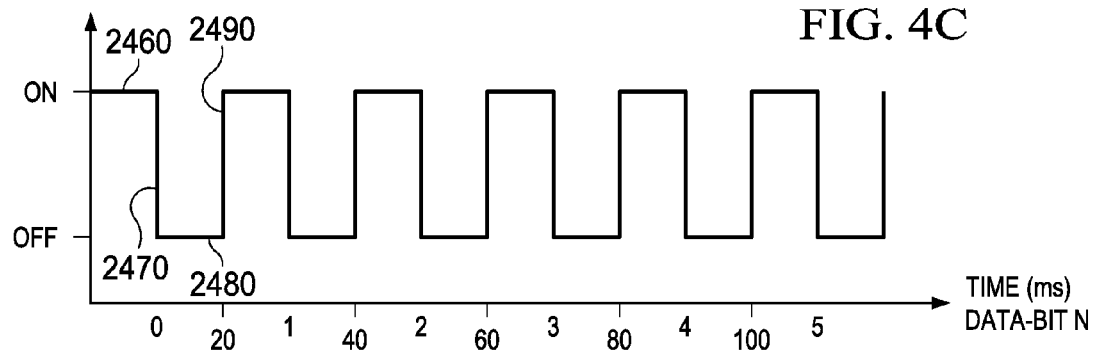
FIG. 4C is another power versus time diagram for an inventive AD receiver showing an example higher frequency duty cycle impressed inside of a coherent summation period for an inventive power save process or mode.
Figure 5A:
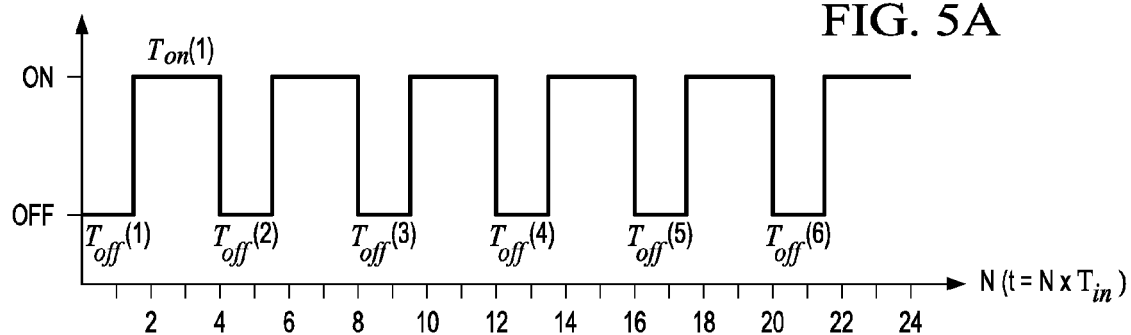
FIG. 5A is a power versus time diagram showing another example higher frequency duty cycle impressed inside of a coherent summation period, for an inventive power-save process or mode.
Figure 5B:
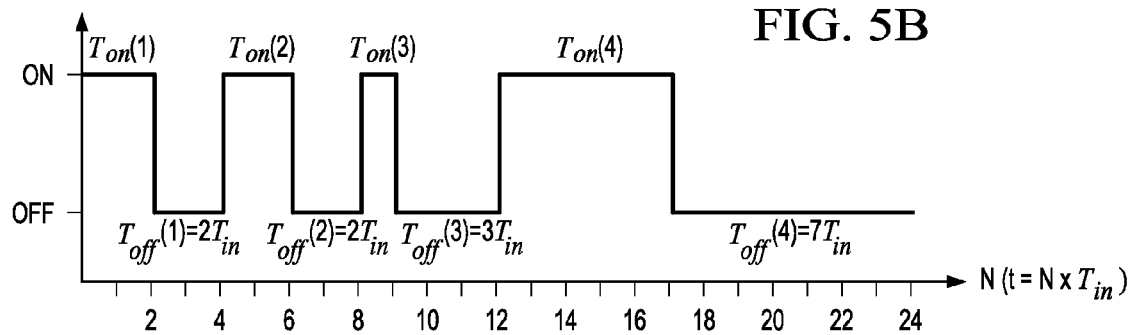
FIG. 5B is a power versus time diagram showing operation of another inventive power save process or mode having a varying duty cycle.

By contrast in some other embodiments, various power saving process forms illustrated in FIGS. 4C, 5A, 5B, and Hybrid mode 2560 of FIG. 6A, more frequently put the receiver to sleep after coherently adding fewer than 20 signal repetitions once the SNR has been sufficiently boosted using coherent summation of FIG. 7. In some embodiments, the Power Save Mode Controller 2130 (2290) gates power through a supply voltage line on and off to impress a duty cycle on the coherent summation interval (e.g., $T_{on}+T_{off}=20$ ms).

In some other embodiments, Power Save Mode Controller 2130 (2290) is operative when a given power saving mode is active to enable at least one counter-and-decoder circuit in block 2350 provided in a given controlled block such as BSP 2250 to gate power through a supply voltage line VDDx on and off to impress a duty cycle on the coherent summation interval. For example, the counter is configured or initialized to hold an initial value of 20 (10100 binary). The counter counts down to zero and repeats the countdown every 20 ms. The decoder circuit is fed by the counter. The decoder circuit has an associated configuration register, and Power Save Mode Controller 2130 (2290) loads that associated configuration register with a value of $T_{off}$ (1011 binary or 11 decimal, say). When the counter counts down to the register value (1011), the decoder circuit provides an active output from then down to zero until the countdown is reset at 20. Power to the controlled block is ON unless gated off by a gating element in response to output active from the decoder ANDed with an Enable. Power Save Mode Controller 2130 (2290) at run time sends the enable signal so that counter-decoder circuit gates the coherent summations off during $T_{off}$. In this way, the Power Save Mode Controller 2130 (2290) impresses a duty cycle on the coherent summation interval of the receiver circuit.

Some embodiments provide additional circuitry and disable and/or enable lines from the decoder to key logic gates in the controlled block to ensure that operations start and stop on particular time boundaries in relation to the duty cycle. For example, a warm-up time epsilon from Equation (7) later hereinbelow is established by gating power on to commence warm-up, and then releasing a disable line to the logic or activating an enable line to the logic thereafter upon completion of the warm-up time epsilon ε (e.g., in the range 0.1 millisecond to 5 milliseconds for epsilon). Some embodiments provide individual counter-decoder controls in each controlled block, so that different width block-specific warm-up times epsilon ε(i) are handled.

The GPS receiver is likely to be able to operate at low signal levels, below −150 dBm. Open-sky GPS signal levels are −130 dBm, so 28 dB of SNR gain delivered, for example, in (20,50) operation is not always necessary. Thus, some of the embodiments put some receiver circuitry to sleep after coherently adding fewer than 20 signal repetitions. For example, in FIG. 4C a (10, 50) receiver can sleep for a total of 500 ms out of each second to reduce power consumption by 50%. The notation (10, 50) signifies that the receiver coherently adds signal for 10 milliseconds out of a possible 20 ms, and non-coherently adds the FIG. 7 coherent-sum results together 50 times every second.

Some embodiments power the receiver at first in one power mode and then operate with a special power saving mode that causes the receiver to sleep and wake set up in a higher rate duty cycle. In FIG. 4C, power is applied during a time interval 2460 designated $T_{on}(1)$. This time interval 2460 is qualitatively different from the time interval 2410 because interval 2460 is a portion of time inside the 20 ms coherent summation period, while time interval 2410 involves the noncoherent summations and comprehends multiple whole coherent summation periods. Upon completion of time interval 2460, an off-transition 2470 occurs, whereupon a power-off interval 2480 elapses. Notice that time intervals 2460 and 2480 in FIG. 4C provide a qualitatively significant granularity wherein power-saving modes can enter the coherent summation period and impress a duty cycle inside the coherent summation period. Then a power-on transition 2490 occurs. Because the coherent summations occur during a 50 times shorter time interval than the 1000 millisecond noncoherent summations, a warm-up time ε(i) for the receiver or pertinent portion thereof is beneficially handled in connection with power-on transition 2490 in some of the embodiments.

In FIG. 4C, 5A, or 5B, a power control circuit 2130 (2290) is coupled to a receiver circuit and operable to impress a power controlling duty cycle on the receiver circuit inside a coherent summations time interval thereof. For example, the receiver suitably goes to sleep at a rate by impressing the power saving duty cycle at relatively high power control rate (50 Hz and higher) on coherent summation intervals or sub-intervals (e.g., 20 milliseconds or less) as contrasted with power saving on the non-coherent summation period at the much lower 1 Hz rate in FIG. 4B. A maximum available interval for coherent summations of a given data symbol is 20 ms in one form of GPS, for instance.

Moreover, the methods of FIGS. 4B and 4C are combined in some embodiments having a Hybrid method 2560 of FIG. 6A. Non-coherent summation ON intervals 2562 and 2568 together occupy a longer combined time ON than might be selected for the process of FIG. 4B, and the OFF-time 2564 can be shorter than 2430-2440. However, as shown by a shaded area box-A under interval 2562 (and 2568), magnified in FIG. 6B, an ON time 2610 is reduced from 20 ms to 10 ms, leaving a 10 ms-wide 50 Hz OFF time 2620. During the ON time 2610, detailed in FIG. 6C for a circle-B small portion 2612 thereof in FIG. 6B, correlators 2310 of FIGS. 3B and 7 are actively processing the PN sequence of FIG. 6C and coherent summation occurs. The combined SNR result of Hybrid power saving mode 2560 is fully adequate and controlled in FIGS. 10-12. Notice that FIG. 6A, 6B Hybrid mode 2560 as illustrated can be described as a (10, 30) receiver, i.e., 10=N and N<20, and 30=M and M<50.

A way of describing FIG. 6A, 6B Hybrid mode 2560 is that the power-save mode involves a composite of a first 50 Hz square wave amplitude modulated with a second 1 Hz square wave or pulse train. The composite is delivered as a power control waveform to gate power to power-managed receiver circuitry. The power control circuit is concurrently operating to impress a power management control longer than the coherent summations time interval on both the coherent summations and the noncoherent summations. If the 1 Hz modulation is increased in frequency even fractionally as in waveform 2540 or increased in frequency to some multiple or more as in waveform 2520, the power management control is impressed on the noncoherent summations during multiple intervals in the one-second noncoherent summations period. In many embodiments, the second frequency (e.g., 1 Hz or more) is less than half the established rate (e.g. 50 Hz or more) for coherent power saving.

Hybrid mode 2560 provides an (N, M) receiver that has an adjustable enable time for noncoherent summations $T_E$. The adjustable enable time=M $T_S$ msec. is equal to M noncoherent summations in a second multiplied by a maximum available coherent summations period $T_S$ (e.g., 20 ms) during which coherent summations can be input to one noncoherent summation in FIG. 7. During coherent summations $T_S$, the square wave has duty cycle N $T_{in}/T_S$ (e.g., N/20 when $T_{in}$=1 ms and $T_S$=20 ms.). Let an established coherent power save mode rate be designated by a frequency F, where F>=1/$T_S$, e.g., 50 Hz or higher. Coherent summations period $T_S$ is 20 ms. or other applicable value for the receiver, and $T_S$>=1/F. Established rate F in FIG. 4C is 50 Hz and in FIG. 5A is 250 Hz. Most embodiments have an enable time for noncoherent summations twice or even much more than twice the coherent summations period, i.e., $T_E$>=2$T_S$>=2/F. Thus, in such embodiments, the enable time $T_E$ for noncoherent summations is also at least twice the duration of the period (>=2/F) of the established coherent power save mode rate F. In some embodiments, as in FIG. 5B, an established coherent power save mode rate average F-bar is suitably defined as n/(2$T_S$), or one half the number n of ON-OFF transitions in coherent summations period $T_S$ divided by that period (e.g., F-bar=8/(2×20 ms)=200 Hz).

Consequently, the improved process decodes the data message accurately while saving power and decodes the message throughout each full second in FIGS. 4C, 5A, 5B. Receiver sensitivity or responsiveness to user dynamics (user motion kinematics as well as user inputs) is improved in the power saving mode (e.g., in FIGS. 4C, 5A, 5B, and FIG. 6A 2520, 2540, 2560) because the receiver is powered on more frequently during the one-second non-coherent summation period. Some embodiments use Doppler to measure user dynamics regarding how fast the user is accelerating. There, sampling more than once in the non-coherent summation period provides more accurate acceleration information for accelerometer applications, and more accurate velocity and position information are derived as well. Some other embodiments do Doppler correction, and sampling more than once in the non-coherent summation period provides more information for Doppler correction. Even though the sampling encompasses more of the non-coherent summation period (e.g., 1 sec), power management targets are nevertheless met by introducing a power saving duty cycle having a relatively rapid rate (e.g., 50 Hz or higher) inside the much shorter coherent summation interval (e.g., when that interval is 20 ms). The rate in coherent power save mode is expressed by the inequality F>=1/PCs where PCs is the coherent summation interval when the most coherent summations are employed, such as with the coherent power saving mode off. In other words, the rate equals or exceeds the reciprocal of the maximum available interval for coherent summations. Moreover, the power saving mode can be used to operate the receiver in more operational scenarios or user applications. More frequently using the power save mode results in reduced power consumption and longer battery life. Testing and verification of the power saving mode or process is performed by monitoring the duty cycle and power management frequency in which the receiver components are operating to establish that the power saving mode is operating correctly. This power saving mode or process can reduce power consumption by more than 50% while not sacrificing any functionality in the receiver by employing a high rate duty cycle of sleeping and waking in the GPS receiver.

The BSP Front end 2170 processes the BPSK signal input from the RF front end 2100 yielding a received data signal $r_i$ after removing the Doppler frequency and correlating with the PN sequence of an incoming satellite, where the received data signal is modeled in complex form as:

$$r_i = d_{\lceil i/N \rceil} \cdot a_i \cdot \exp(\sqrt{-1} \cdot \phi_i) + n_i, \quad (1)$$

where i is the discrete time index (e.g., indexing each millisecond), $d_k$ is original data that was BPSK modulated and transmitted redundantly on N consecutive indices, $a_i$ is the magnitude at time index i, $\phi_i$ is the phase at time index i, and $n_i$ is the additive noise at time index i. In addition to typical noise sources, the noise may also contain interference from other signal transmissions. In some cases, the data is either not present or can be removed so that effectively $d_k=1$ for all $k=\lceil i/N \rceil$, meaning first integer greater than or equal to the ratio of time index i divided by the number of redundant indices N. Any of numerous variations of the BSP front end 2170 can be structured to yield the received signal $r_i$. Power-save modes as taught herein are useful with any specific method of generating the received signal.

In many applications, the $SNR=E[|a_i|^2]/E[|n_i|^2]$ is so small that the receiver beneficially does extra processing to boost an effective SNR. An accumulate and dump AD section 2180 performs coherent and/or non-coherent accumulation of the received signal $r_i$ that boosts the effective SNR.

The coherent accumulation of a set of received signals is a summation of those signals themselves from Equation (1) defined as:

$$c_{COH}(r(S), S) = \sum_{j \in S} r_j, \quad (2)$$

where S includes the time indices j from the available received signals to be included in the coherent accumulation, and where $r(S)=\{r_k|k \in S\}$.

Non-coherent accumulation of received signals sums values of a function of the signals and is defined as:

$$c_{NCOH}(r(S), S) = \sum_{j \in S} f(r_j), \quad (3)$$

where the function $f(r)$ may be implemented in many ways. For example, when r is a scalar the function $f(r)=|r|^p$, where p=1 or 2 is commonly used. The particular function used to implement the non-coherent accumulation is not critical and any such function is acceptable from the point-of-view of the power-save mode processes and structures. Another way to boost effective SNR is to non-coherently accumulate a set of coherent accumulations of the received signal as in FIG. 7 and Equation (4).

$$c_{NCOH}\left(r\left(\bigcup_{j \in S} S_j\right), S\right) = \sum_{j \in S} f(c_{COH}(r(S_j), S_j)), \quad (4)$$

where $S_j$ is the set of indices of the received signal to be included in the j-th coherent accumulation 2722.j delivered by summers 2720.j, and S specifies the set of coherent accumulations to include in the non-coherent accumulation 2712 delivered by summer 2710. Notice this set of indices $S_j$ is determined by Power-Save Mode waveform frequency and duty cycle as graphically shown in FIG. 4C, FIGS. 5A, 5B, and FIGS. 6A, 6B.

In some embodiments, the non-coherent summations are functions of multiple correlations wherein, for example, at one time instant an early correlation has a PN sequence intentionally shifted so the correlation is before the correlation peak, and a late correlation has a PN sequence intentionally shifted so the correlation is after the correlation peak. Then operations non-coherently combine these early (E) and late (L) correlations to reduce error. For example, error $e_i=(|E|-|L|)/(|E|+|L|)$ or $e_i=(|E|-|L|)/(2^*|P|)$ where P is the peak (on-time, time-synchronized) correlation for a given 20 ms time index. Then at the next time index (20 ms later) another value $e_{i+1}$ is computed, etc., and these non-coherent values are added over time after some scaling. Multiple values of $r_i$ at a given time index i go into a function f( ). Each $r_i$ has a different phase and noise, so $r_i$ is a vector having the multiple values as its elements, and $f(r_i)$ for time index i is a function of the multiple values of $r_i$ at a given time index i.

The receiver demodulates the data, i.e. estimates the values of $\{d_k\}$. Since the data symbol is repeated N times, the coherent accumulator can use $c_{COH}(r(S_k),S_k)$, and set $S_k$ is a set of the data indices k expressed as $S_k \subset \{(k-1)N+1, (k-1)N+2, \ldots (k-1)N+(N-1), k \cdot N\}$ where $k=1, 2, \ldots M$ and $k=\lceil i/N \rceil$ in an (N,M) receiver in order to estimate the data symbols $d_k$. The data demodulator may be implemented in many ways, and power-save mode processes and structures herein can benefit receivers regardless of the specific technique used to demodulate the data. Therefore, define the data demodulation as:

$$\hat{d}_k = g(c_{COH}(r(S_k), S_k)) \quad (1)$$

For example, if the magnitude of $\Phi_i$ is minimized while computing $r_i$ and $d_k \in \{\pm 1\}$ then g(x) may be defined as $$g(x)=\text{sign}(x). \quad (6)$$

Note that an estimate of the data is extracted from the coherent accumulation of the received signal, during all or some subset of the repetitions of the same data symbol on received signal $r_i$. The bit error rate for this data demodulation is discussed in connection with FIG. 8A.

Figure 6D:
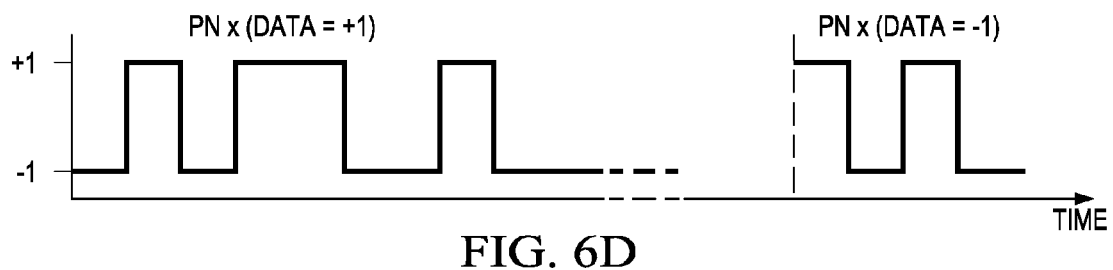
FIG. 6D is a voltage versus time diagram of the Coherent Power Save with Multi-sample Non-coherent (Hybrid) power saving mode with the time scale same as in FIG. 6C showing binary (+1, −1) data impressed on successive repetitions of the pseudorandom noise (PN) sequence of FIG. 6C.

Suppose a GPS receiver 2200 includes an accumulate-and-dump AD section 2180 as described in connection with FIGS. 1, 2, 3A, 3B. The GPS signals from each satellite of FIG. 9A use different spreading sequences and arrive with different Doppler shifted carrier frequencies. After the received signal passes through the RF front end 2100 (2210), the effect of the Doppler shift in frequency from a target satellite SVi is removed. Then the spread spectrum signal of FIG. 6D is de-spreaded by correlating it with the known PN sequence of the satellite, compare FIG. 6C. The noisy signal output $r_i$ of the de-spreading process is modeled by Equation (1). The processing gain of the de-spreading process is the first step towards bringing the signal out of the noise. In some cases, the signal strength is so low that it requires more signal processing to boost the signal. In addition, receiver 2200 uses multiple correlations with different time offsets in FIG. 7 (e.g., 10.0, 10.1, 10.5) to track how the transit time of the signal evolves as the satellite continues along its orbit. Receiver 2200 processes the outputs of the de-spreading process using AD section 2180 to further boost the signal strength. For instance, the spreading sequence of the GPS L1 C/A signal has a duration of one millisecond in FIG. 6C and is transmitted repeatedly. Each block of twenty consecutive PN spreading sequences are modulated with the same one data bit value $d_k=+1$ (or $d_k=-1$). In some embodiments, the data modulation is removed by receiver circuitry so that larger amounts and longer times of coherent integration are provided. For a GPS receiver that coherently integrates the signal over 20 ms, the set S for Equation (2) during the k-th data-bit is $\{20*(k-1)+1, 20*(k-1)+2, \ldots 20*(k-1)+20\}$. For a GPS receiver that has a 1 second dwell time by coherently combining 50 consecutive 20 ms non-coherent combinations, see summation 2710 in FIG. 7, the sets in Equation, (4) are defined as $S_k=\{20*(k-1)+1, 20*(k-1)+2, \ldots 20*(k-1)+20\}$ for i=1 to 20 and k=1, 2, 3, … 50.

Power-Save Mode. Depending on the application, coherent accumulations 2720.i, 2722.i and/or non-coherent accumulation 2710, 2712 of Equations (2)—, (4) provide enormous SNR gains. In fact, in some scenarios the SNR gain is more than sufficient to meet the receiver's requirement. In such cases, the receiver may omit processing parts of the received signal in order to save power. If the receiver does not need to process the received signal at time index i, then power save mode controller 2130 (2290) switches off all or some of the receiver blocks or components in order to save power. The more blocks or components that are switched off and the longer they are turned off, the greater the power savings. In the same way power save mode controller 2130 (2290) determines when to turn-off some components, it also chooses when to turn them back on to resume processing of the received signal.

There are many different embodiments by which power save mode controller 2130 (2290) switches components on and off and handles practical issues. Some components require time to warm up, in which case time is allowed for these components to warm up before processing the received signal. Since each component has different characteristics, they need not be switched off at the same time, nor switched back on at the same time. Although all components could be switched on and off simultaneously, components with shorter warm-up times may be left switched off for longer to maximize the power savings.

An initialization procedure during the warm-up time ensures that components begin from the correct initial state. Storing/loading some variables to/from memory is performed as appropriate in the process. In FIG. 3A, Power-Save Mode Controller 2290 has logic that sends signals to the various receiver components to switch them on and off at the right times. In addition, the Power-Save Mode Controller 2290 ensures that each component is properly initialized after it is switched back on.

In order to describe some of the power-save mode process embodiments, some notation used in FIG. 5A and FIG. 5B is defined to describe the receiver processing. A received signal, $r_i$, is generated by the BSP front end 2170 every $T_{in}$ seconds (e.g., each 1 ms).

1. The receiver non-coherently and/or coherently accumulates the output of the BSP front end during $T_C$ seconds (e.g., 1000 ms) in order to compute its output, where $T_C = N_C \cdot T_{in}$ and $N_C$ is a positive integer (e.g., 1000).
2. The receiver produces new outputs every $T_C$ seconds.

While operating in the power-save mode the receiver 2200 still produces its outputs every $T_C$ seconds, e.g., every 1000 ms. The difference is that receiver 2200 does not use all of the signal to compute its output. Instead, in power-save mode the receiver 2200 uses the received signal from only $\tilde{T}_C$ out of the $T_C$ seconds to compute its output, where $\tilde{T}_C = \tilde{N}_C \cdot T_{in}$ and $\tilde{N}_C$ is a positive integer less than or equal to $N_C$. A Power Save ratio in periodic embodiments is $\tilde{N}_C/N_C$. In periodic or non-periodic embodiments $\tilde{N}_C$ is the number of index values in set $S_k$ used in each $T_C$ seconds for doing summations.

Some of the power-save modes or process embodiments herein switch one or more receiver components on and off in order to save power while causing minimal degradation of the receiver 2200 performance. During the $T_C$ seconds when the received signal is being processed, some or all of the components are switched on and off $N_T$ times, where $N_T$ is a positive integer. The components are not needed for $T_{rest}(i)$ seconds the i-th time they are switched off, so they can stay off for $T_{off}(i)$ seconds:

$$T_{off}(i) = T_{rest}(i) - \epsilon(i), \qquad (7)$$

where i=1, 2, …, $N_T$, where $\epsilon(i)$ is the warm-up time required by the component the i-th time it is turned on. In the end, $\tilde{N}_C$ received signals are used to compute the receiver output, but the set of received signals used may be distributed across the $T_C$ second period. Out of the total $T_C$ seconds, the components are switched off for $T_{off}$ seconds:

$$T_{off} = \sum_{i=1}^{N_T} T_{off}(i), \qquad (8)$$

where $T_{off} \leq T_C - \tilde{T}_C$. The value of $T_{off}$ may be different for each component, either because each component is given a different amount of time to rest or because the components require different amounts of time to warm-up. Thus, the receiver process and/or structure has plural portions or components, and in some embodiments the power gating circuit is operable by a control circuit to turn power on and off to different portions or components at different times. While operating in the power-save mode, the power consumed by a component is reduced by $T_{off}/T_C\%$.

The power mode frequency is given by the ratio $$F = N_T/T_C. \qquad (9)$$

A power mode duty cycle ratio is $$D_C = 1 - (T_{off}/T_C) = T_{on}/T_C. \qquad (10)$$

The particular parameters that allow the power-save mode to minimize power consumption depend on the particular receiver and/or architecture employed. Receiver performance trades off with power savings to some extent. Specifically, a smaller value of $N_T$ means less overhead $N_T \epsilon(i)$ or $$\sum_{i=1}^{Nt} \varepsilon(i)$$

is spent warming up a given component in each time interval $T_C$. On the other hand, the longer its components are switched off, the more difficult it is for the receiver 2200 to track dynamics in the underlying signal. Therefore, the best choices for $N_T$ and $\{T_{off}(i)\}$ depend on the application.

FIG. 5A and FIG. 5B give two examples of how the Power-Save Mode Controller signals one or more components to switch on and off. In FIG. 5A, five power switching cycles each have a 1.5 ms OFF period $T_{off}(1), (2), \ldots$ and a 2.5 ms ON period $T_{on}(1), (2), \ldots$ during each 20 ms coherent summation cycle. In FIG. 5B, a plurality of power switching cycles are unlike each other, as indicated by unequal OFF periods and unequal ON periods. In fact, in FIG. 5B, the power switching cycles are unlike each other from one 20 ms coherent summation cycle to the next such coherent summation cycle. In some embodiments the high average-rate power switching cycles compose a larger cycle of operation and that spans more than one coherent summation cycle. In some other embodiments, the power switching cycles are established according to a random or pseudorandom power pattern with predetermined statistics such as mean and standard deviation.

For simplicity, the notation does not distinguish between the values of $N_T$, $\{T_{off}(i)\}$, or $\{\epsilon(i)\}$ for each component in the receiver 2200. However, note that these values may or may not be different for each individual component.

Power-Save Mode Controller 2130 (2290) suitably has sufficient information to determine when to use the power-save mode and how to specify power mode parameters $N_T$ and $T_{rest}(i)$, and then the outputs are delivered to the receiver blocks as described herein. Some (static) embodiments hard-code these values so that the same variation of the power-save mode is always used. Other (dynamic) embodiments as in FIGS. 10, 11, 11A, 12 have a power-save mode controller that specifies the power-save mode parameters dynamically.

The Power-Save Mode Controller specifies the power-save mode parameters based on one or more metrics of the incoming signal. The RF Front end 2100 and/or the BSP Front end 2170 provide one or more metrics from the signal to the Power-Save Mode Controller 2130 (2290). One suitable metric, for instance, is an approximation of the SNR from which the Power-Save Mode Controller 2130 (2290) determines how much accumulation (coherent and/or non-coherent) is needed to process the signal properly. The BSP Front end 2170 or entire BSP 2250 estimates the dynamics of the signal (e.g., Doppler shift and Doppler difference $\Delta D$ and SNR trend) so that the Power-Save Mode Controller 2130 (2290) determines how long ($T_{off}$) components may be switched off without losing track of the signal. The receiver 2200 monitors the metrics throughout its processing and Power-Save Mode Controller 2130 (2290) adjusts the power-save mode duty cycle to maximize power savings while at the same time keeping track of the signal dynamics. (See also FIGS. 10-12).

The way the power saving mode parameters or sets, S and $\{S_j\}$, are chosen for the AD section 2180 is related to the choice of the power-save parameters, $T_{off}(i)$ and $N_T$, and vice-versa. For example, consider an (N, M)-AD section 2180 defined by specifying the parameters in Equation, (4) as $S_j \subset \{(j-1)N+1, \ldots, j\cdot N\}$ and $S \subset \{1, 2, \ldots, M\}$. In this case, the total number of received signals $r_j$ accumulated is $\tilde{N}_C = M \cdot N$. This means that a specified value of number $\tilde{N}_C$ can be delivered by reducing noncoherent summations M while increasing the number of coherent summations N, or by increasing the number of noncoherent summations M while decreasing the number of coherent summations N. Also a specified SNR boost in dB can be delivered similarly and by optimizing a merit function that holds SNR boost to a target level while adjusting noncoherent summations M and coherent summations N. The same (N, M)-AD receiver can use different variations of the power-save mode. One variation is $N_T=1$ and $T_{off}(1)<M\cdot N\cdot T_{in}$, (compare FIG. 4B or mode 2510 of FIG. 6A) wherein when M>1, data is not demodulated for all of the data bits or the data is not demodulated at all while the receiver is operating in power-save mode. Alternatively, the data can be demodulated while also saving power if the power-save mode parameters are chosen as $N_T=M$ and all $T_{off}(i)<N\cdot T_{in}$ (Compare to FIGS. 4C and 5A).

Receiver 2200 can use coherent accumulation as defined in Equation (2) without more to boost the SNR. In other words, the SNR can be already high enough without additional non-coherent accumulations. For example, with the GPS L1 C/A code this may be achieved by removing the data from the signal before accumulating across different data bits. Alternatively, receiver 2200 coherently accumulates for a duration less than or equal to 20 ms. Some other kinds of signals such as modernized signals (modernized GPS) contain pilot signals where there is not any data modulation.

One embodiment operates GPS receiver 2200 with $T_C=N_C \cdot T_{in}$ and $T_{in}=0.001$ seconds using only coherent accumulation. If the SNR is sufficiently high, then receiver 2200 does not need to accumulate the signal throughout the entire time interval $T_C$ seconds. Instead of increasing the frequency of its outputs, the receiver 2200 is operative to operate in the power-save mode by accumulating only during $\tilde{T}_C$ seconds.

The receiver 2200 accounts for the time it was switched off in order to track the signal dynamics. Specifically, the receiver 2200 typically has an estimate of how the Doppler frequency is changing in time. The estimate $D_{est}(m+1)$ of the Doppler frequency at the time when the receiver 2200 wakes up (begins $T_{on}$) suitably accounts for the time the receiver was switched off. A way to do this is to add the product of $T_{off}(i)$ times the rate of change $\Delta D/T_C$ of the Doppler frequency to the estimate $D_{est(m)}$ of the Doppler frequency from before the receiver was switched off, so that when the receiver wakes up, $$D_{est}(m+1) = T_{off}(m) \Delta D / T_c + D_{est}(m).$$

Figure 9B:
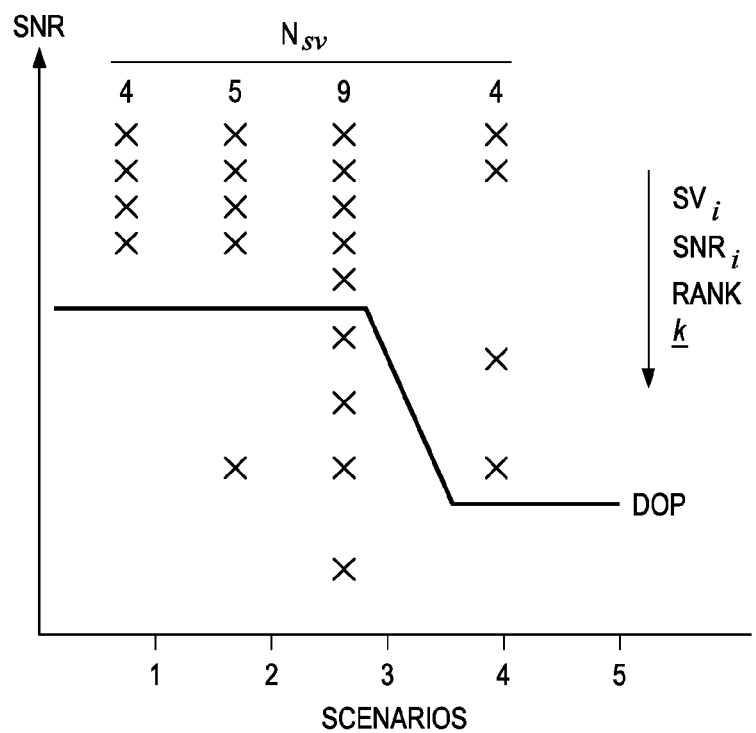
FIG. 9B is a collection of columns of "X" symbols with the columns enumerated along the horizontal axis and each column representing a different scenario of numbers of satellites acquired by an inventive AD receiver, each "X" symbol in a scenario column representing an example of SNR of a different one of the acquired satellites, for use in an inventive process of FIG. 11.
Figure 9C:
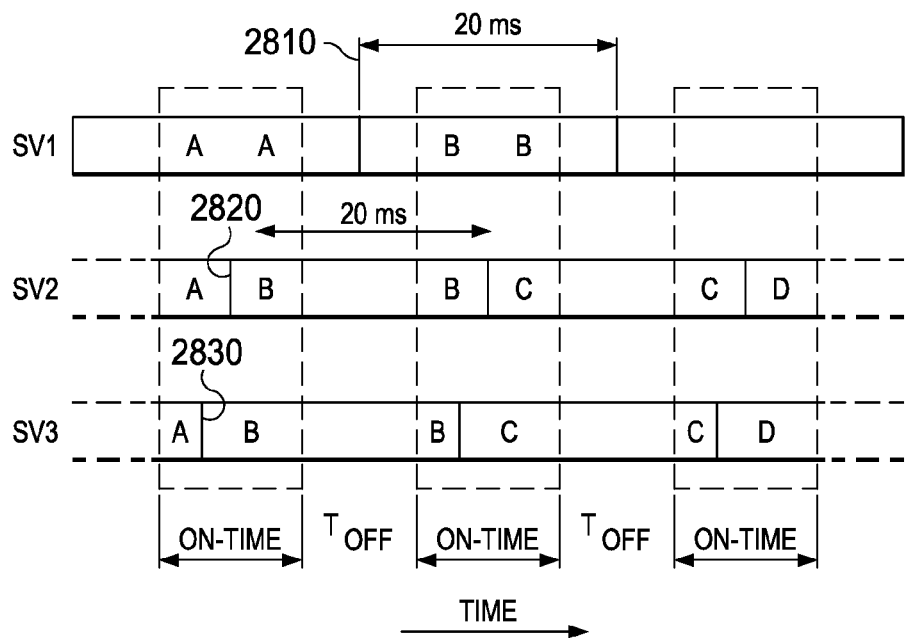
FIG. 9C is three graphs of symbol arrival versus time for three satellites respectively, wherein the times of arrival differ.

In the FIG. 9C GPS application, multiple satellite signals are received at the same time, which impacts the power-save mode because the signals are not synchronized. This means that in some cases the window of time $T_{on}$ for which the receiver 2200 is powered on will include a data-bit transition for one or more of the satellite signals. To counteract the performance loss this may cause, the receiver 2200 operates to determine the period of time during the $T_C$ seconds that includes the fewest data-bit transitions, or ensures that the weaker signals do not have data-bit transitions during the period of $\tilde{T}_C$ seconds that the signal is processed. This is possible when the receiver 2200 has already estimated when the data-bit transitions occur for each satellite signal SVi it is tracking. This technique of minimizing the data-bit transitions can be done, but it is not mandatory. For example, the receiving process can also add across the $T_{off}$ gap, to add coherently within the 20 ms.

FIG. 7 shows structure and operation for coherent and non-coherent processing in one channel i for one satellite SVi signal i, see 2310.i and 2320.i in FIG. 3B. In FIG. 7, autocorrelation peaks are obtained that relate to receiver local time $t_{Rj}$ for each acquired satellite j on which processing is performed. The autocorrelation process includes coherent summation of FIG. 7. The beginning of each 1 ms PN sequence is locked in the satellite to the satellite time base. Consequently, the position of the autocorrelation peak at the receiver is useful to establish time $t_{Rj}$ in the navigation equations. The beginning of each 1 ms PN local sequence is locked to the receiver timebase, or search-shifted a known amount relative to the receiver time base. Using the position of the autocorrelation peaks from at least four satellites, not only is the receiver position ($x_{1R}$, $x_{2R}$, $x_{3R}$) obtained from the navigation equations but also the bias error e of the time base of the receiver 2200 relative to the atomic time base of the system of satellites is obtained. Some embodiments use the Precision P code for the PN sequence for high accuracy, or use both the P and C/A codes likewise. Some embodiments track phase of the carrier itself to determine user kinematics or other precise measurements. A longer noncoherent summation interval, such as 10 seconds, is used to deliver enhanced SNR in some embodiments by operating the receiver as a (20, 500) receiver for such receiver position and bias error operations, and operating the receiver instead as a (20, 50) receiver at somewhat lower SNR for data reception operations such as ephemeris, satellite identification, and almanac.

Accumulate-and-dump refers to either or both coherent and noncoherent accumulation and transfer of the results in either case to a following stage or to a memory.

Figure 8A:
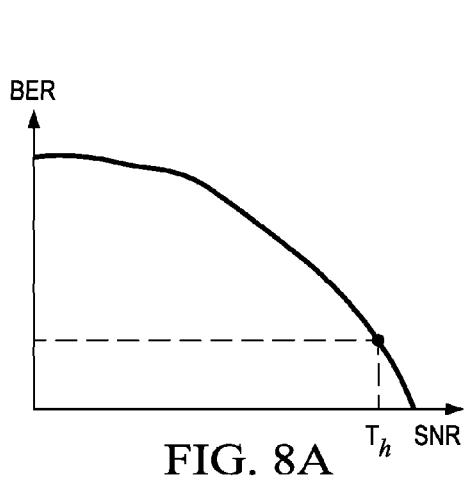
FIG. 8A is a graph of Bit Error Rate (BER) versus Signal to Noise Ratio (SNR).

In FIG. 8A, bit error rate BER for data reception in Equation (1) declines with SNR. System designer establishes a specification of maximum acceptable BER, and SNR is kept above an SNR threshold $T_h$.

Coherent accumulation adds rms (root-mean-square) signal voltage a arithmetically with number of repetitions while noise, being statistical, accumulates in rms value more slowly as the square root of the number of repetitions so that SNR=a/n is boosted, i.e., $$(Na/(n\sqrt{N}))^2 = N*SNR$$

Thus, applying N coherent additions to an original SNR is expressed in dB by $$10 \log_{10}(SNR*N) = 10 \log_{10}(SNR) + 10 \log_{10}(N).$$

The SNR boost is thus given by the term $10 \log_{10}(N)$.

Bit error rate BER herein is regarded as the probability that data $d_k$ having one intended value, say +1, is reversed to −1 is sending both data plus noise to a threshold device. The noise has some probability density distribution $f(v) = \eta(0, n\sqrt{N})$ wherein random noise voltage variable v has zero mean and standard deviation (rms value) equal to $n\sqrt{N}$. Due to coherent addition signal voltage is voltage Na. Probability BER of an error of $d_k$=+1 being reversed to −1 by threshold detection given by SIGN(Na−v)<0 is found by writing a defining integral over the noise distribution, normalizing to obtain a normalized (and Gaussian, e.g.) probability density distribution having zero mean and unity standard deviation, and integrating over the normalized probability density distribution with scaled limits of integration. The result is equal to the cumulative distribution C for the normalized probability density distribution.

$$BER = \int_{-\infty}^{-Na} \eta(0, n\sqrt{N})\,dv$$
$$= \int_{-\infty}^{-(a/n)\sqrt{N}} \eta(0, 1)\,dv$$
$$= C(-\sqrt{N*SNR}).$$

The argument of the cumulative distribution C is the negative of the square root of the boosted SNR. As suggested by FIG. 8A, the cumulative distribution C goes from p=0.5=BER when the SNR is zero down to lower values of BER approaching zero as the boosted SNR rises.

Figure 8B:
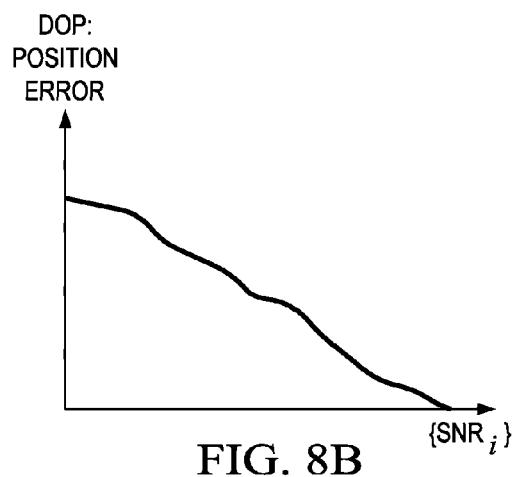
FIG. 8B is a graph of Dilution of Precision (DOP) or precision error versus SNR.

In FIG. 8B, Dilution of Precision DOP is a family of GPS metrics. For instance, Positional DOP and Horizontal DOP relate to types of error in measured receiver position using a set of acquired satellites. DOP may decline with SNR. Also, two flavors of DOP are weighted DOP (W-DOP) and unweighted DOP. Weighted means weighted by SNR so W-DOP increases as SNR decreases, but the more important factor is the satellite sky position geometry. Unweighted DOP does not depend on SNR and does depend on the sky position geometry of the satellites. If acquired satellites are close to one another in the sky or have approximately coplanar lines from each satellite to the receiver, the DOP can be undesirably higher than if they are displaced in several directions.

Positional DOP is related to the change $\Delta X_R$ in the position solution $X_R$ obtained from the navigation equations based on the parameters and their standard deviations. The change is suitably expressed as some magnitude function such as $\Delta X_{1R}^2 + \Delta X_{2R}^2 + \Delta X_{3R}^2$ for Positional DOP (or square root thereof). Regarding uncertainty in the horizontal position solution, an analogous distance function for Horizontal DOP suitably uses or relates to sum of squares of changes in coordinates for orthogonal basis vectors tangent to the surface of the Earth at the latitude and longitude of the navigation position solution $X_R$. A metric for dilution of precision when used in lower case herein also applies to any function that delivers an estimate of uncertainty in the position of the receiver, such as a position sensitivity metric or a function of partial derivatives of receiver position with respect to parameters in the navigation equations using current ephemeris data for a set of k satellites. Any monotonic function of a dilution of precision metric is also within the meaning of dilution of precision. Any one of a family of metrics such as time DOP, or some other positioning system dilution of precision metric can be useful. For instance, some systems have associated accelerometer and/or wireless triangulation data that may be combined with satellite data in an appropriate method of position calculation when the satellite receiver has some but too few satellites to achieve a position fix. Then the dilution of precision metric is established in a manner suited to the actual system and method of position calculation.

In FIG. 9A, the GPS receiver 2200 of FIG. 3A (1190 or 1495 in FIG. 17) receives a plurality of signals from satellites SV1, SV2, SV3, . . . SVi, . . . $SV_{Nsv}$. Each of the satellites provides known pseudo-random PN signal sequences at intervals interspersed with identification and other data from each satellite. GPS Engine GE 3760 of FIG. 13 in GPS unit 2200 (1190, 1495), when sufficient time and power and signals to make a fix are available, can and does by itself generate a signal GPSTIME on GPS_IO in FIG. 13 that recovers atomic-accuracy time ($t_{Rj}$+e) from the satellite positioning system as well as generates position information $X_R$ specifying the geographic position of the GPS unit 2200. The geographic position can also include GPS unit 2200 elevation above the surface of the earth, when enough GPS satellites are received. The GPS unit 2200 has a velocity vector v relative to the local surface of the Earth at that geographic position that subjects the signals received by GPS unit 2200 to a degree of frequency shift called the Doppler shift that goes beyond that Doppler shift of the signals from the moving satellites relative to a seemingly-stationary receiver at the same place on the rotating planet Earth. Improved processes, circuits and systems are provided herein and recognize the stringent power and battery life demands of mobile devices and similar considerations and constraints in other portable and even fixed applications.

In FIG. 9B, a collection of columns of "X" symbols represent different scenarios enumerated along the horizontal axis. From scenario to scenario, each different scenario has different numbers of acquired satellites and/or different SNR's for the satellites. Each "X" symbol in a scenario column represents an example of SNR of a different one of the acquired satellites. The process embodiment of FIG. 11 processes these SNRs.

Figure 11A:
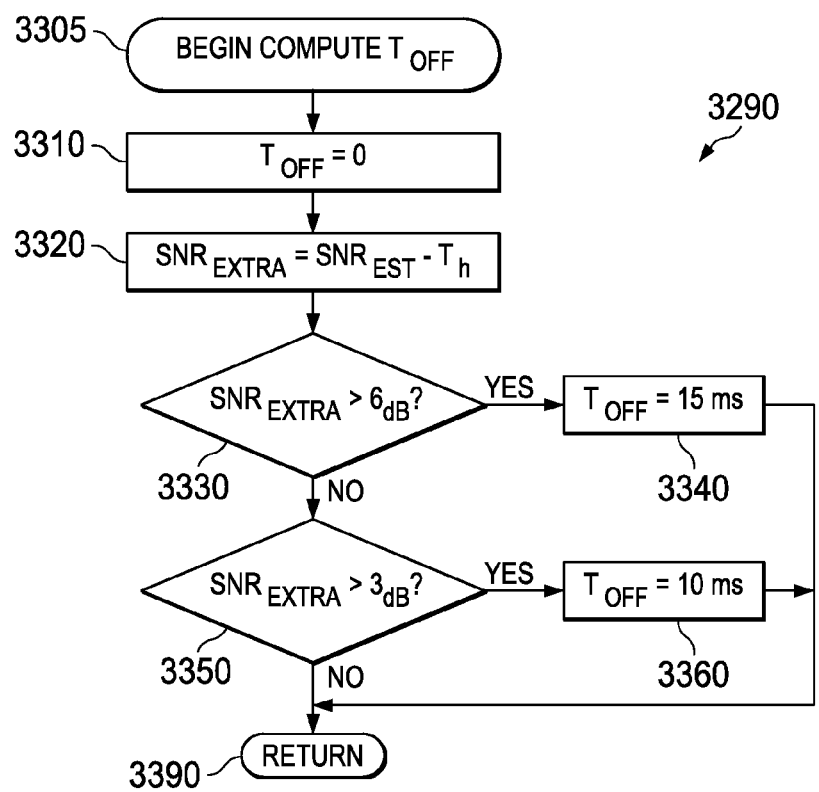
FIG. 11A is a flow diagram of an inventive process associated with FIG. 11 and/or FIG. 12 of determining a power saving off-time for a duty cycle of an inventive power saving mode, such as for FIG. 10.
Figure 11:
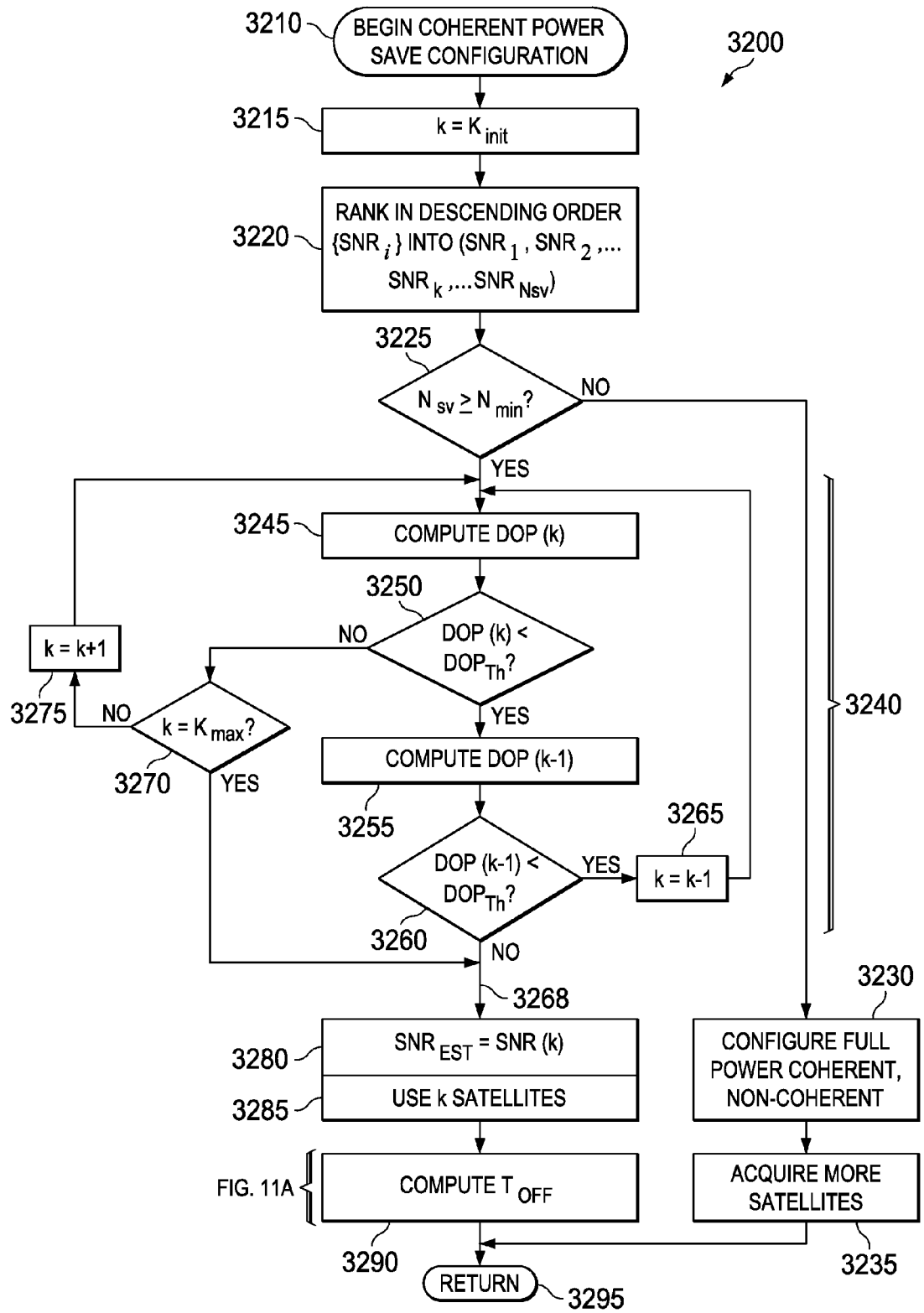
FIG. 11 is a flow diagram of an inventive Coherent Power Save process for FIG. 10 and determining a subset of the acquired satellites from various scenarios of FIG. 9B.

FIG. 9B is now discussed to explain some reasoning behind some of the process embodiments such as that of FIG. 11. In FIG. 9B, Scenario 1 involves a minimum usable number 4 of acquired satellites. Their SNRs are moderately similar and processing the signals of all four satellites of Scenario 1 yields a position estimate that has a relatively low (acceptable, desirable) dilution of precision that lies on an acceptable side of a DOP line in FIG. 9B.

Scenario 2 involves the four satellites of scenario 1 as well as an additional acquired satellite that has relatively low SNR as indicated by the low vertical position of another symbol "X" in the column of this Scenario 2. Even though the additional acquired satellite is capable of delivering usable information, the first four satellites deliver an acceptable (low) DOP, and power saving mode controller 2290 of FIG. 3A is operated in such a way that the additional acquired satellite is ignored and power is saved relative to the power which would be used to process signals from all five of the acquired satellites of Scenario 2.

In FIG. 9B, Scenario 3 involves nine acquired satellites. Fewer satellites are fully sufficient to achieve an acceptable DOP, and the highest SNR satellites are selected. Thus some embodiments rank $SNR_i$ of the satellites and assign each of them rank k as illustrated from highest SNR rank (1) down to lowest rank (e.g., 9 for lowest SNR in scenario 3). Power saving mode controller 2290 is operated in such a way that the additional acquired satellites below the DOP threshold are ignored and power is saved relative to the power which would be used to process signals from all nine of the acquired satellites of Scenario 3.

In FIG. 9B, Scenario 4 involves four acquired satellites, including two satellites of relatively high SNR and two of relatively low SNR. In the illustration, the DOP threshold separates the selected satellites from the unselected satellites. The DOP threshold in Scenario 4 is not exceeded by the receiver operations on the four acquired satellites. Accordingly the DOP threshold line in FIG. 9B, bends down to include all four of the acquired satellites of Scenario 4.

FIG. 9C shows how receiver position and satellite path delay result in differing times of reception 2810, 2820 and 2830 of identical symbol streams from satellites such as SV1, SV2, SV3. The receiver channels in FIG. 3B process symbol streams having symbol periods that are delayed relative to each other for the coherent summations in different channels. Concurrently, Power save mode controller 2290 provides power during a series of ON-time powered intervals Ton.

For example, during a first ON-time in FIG. 9C, receiver 2200 in data reception mode might recover a plurality of instances of symbol A from satellite SV1, symbol A and B from satellite SV2, and symbol A and B from satellite SV3. Or if the ON-time is somewhat wider, two A and two B symbols from satellite SV2 together with one A and three B symbols from satellite SV3 are retrieved. Then in a succeeding ON-time, receiver 2200 receives symbols B from satellite SV1, two B and two C symbols from satellite SV2, and one B and three C symbols from satellite SV3 are retrieved, etc. Depending on the path delay or time of arrival from each satellite, a number of possibilities of symbol reception exist. Accordingly, the processing in position engine 2270 and/or host processor MPU 2370 is arranged so that the symbols are appropriately recovered and not confused.

In reception of data symbols in FIG. 6D, some embodiments provide 20 ms-wide windows appropriately shifted for each satellite to capture a same-symbol run from each satellite, as in FIG. 9C. With coherent power save mode activated, the time shifted 20 ms window for data from each satellite is interrupted in a generally different way by the off-time $T_{OFF}$. With coherent power save mode activated, the receiver channel for satellite SV1 operating during on-time $T_{ON}$ captures part of a same-symbol run for symbol A, and part of a same-symbol run for symbol B thereafter. By contrast, the receiver channel for satellite SV2 or SV3 operating during same on-time $T_{ON}$ captures successive mixtures of symbols. Put another way, the time shifted 20 ms window for data from each satellite SV2 or SV3 have two successive ON-Time segments $T_{ON}$ containing parts of a symbol run for symbol B but separated by off-time $T_{OFF}$. That circumstance is handled by the circuitry for summer 2720.i which accumulates the same-symbol run from the channel for satellite SVi except for the part in off-time $T_{OFF}$ wherein retention is provided.

The channel processors 2320.i keep track of when a new symbol period starts and use part of counter circuitry 2350 (FIG. 3B) continually powered to keep time during the entire symbol periods even during power off-time $T_{OFF}$ when power is cut to the channels themselves. Suppose a symbol period has already elapsed one (1) ms in a given channel when power is turned off for 11 ms. Then power returns for 9 ms. beginning when the symbol period has elapsed 12 ms. Coherent summation building on the earlier 1 ms is resumed later in the symbol period and continues accumulation for 8 ms and delivers 9 ms output of coherent summation for a symbol, whereupon a channel time counter in block 2350 rolls over or becomes reset, and the process begins again and commences a succeeding symbol period.

Concurrently, suppose another channel processor is at 18 ms into a symbol period and completes its coherent summation for the terminated symbol run as the on-time ends. Power is off for 11 ms and resumes 9 ms. into the succeeding symbol period ((18+11)mod 20=9). The time counter in circuitry 2350 for this channel has been counting in the meantime and has set a handshake flag indicating that a new symbol period is currently underway. The channel processor resets the handshake flag when power resumes. As power resumes at 9 ms. the channel begins coherent summation to detect a new symbol for 9 ms in the new symbol period before completing the nine coherent summations whereupon power is again turned off. Thus, each channel processor is suitably programmed or configured to take account of the power using the counters 2350.

In some embodiments, operations also recognize that due to differing propagation delays from different satellites, the ON-Time onset instant in the power save duty cycle in FIG. 9C is not or even cannot be coincident with a nearest instant between 1 ms PN sequences in each channel. If it is desired to prevent coherent accumulation of fractions of 1 ms intervals, then logic circuitry (e.g., ANDing logic) for each channel is coupled to a counter that establishes the power save duty cycle and to a channel time keeping counter that is aligned with the 1 ms PN sequences, to enable commencement of coherent accumulation precisely on the instant when a latest 1 ms PN sequence begins in the channel during ON-Time $T_{ON}$.

Figure 10:
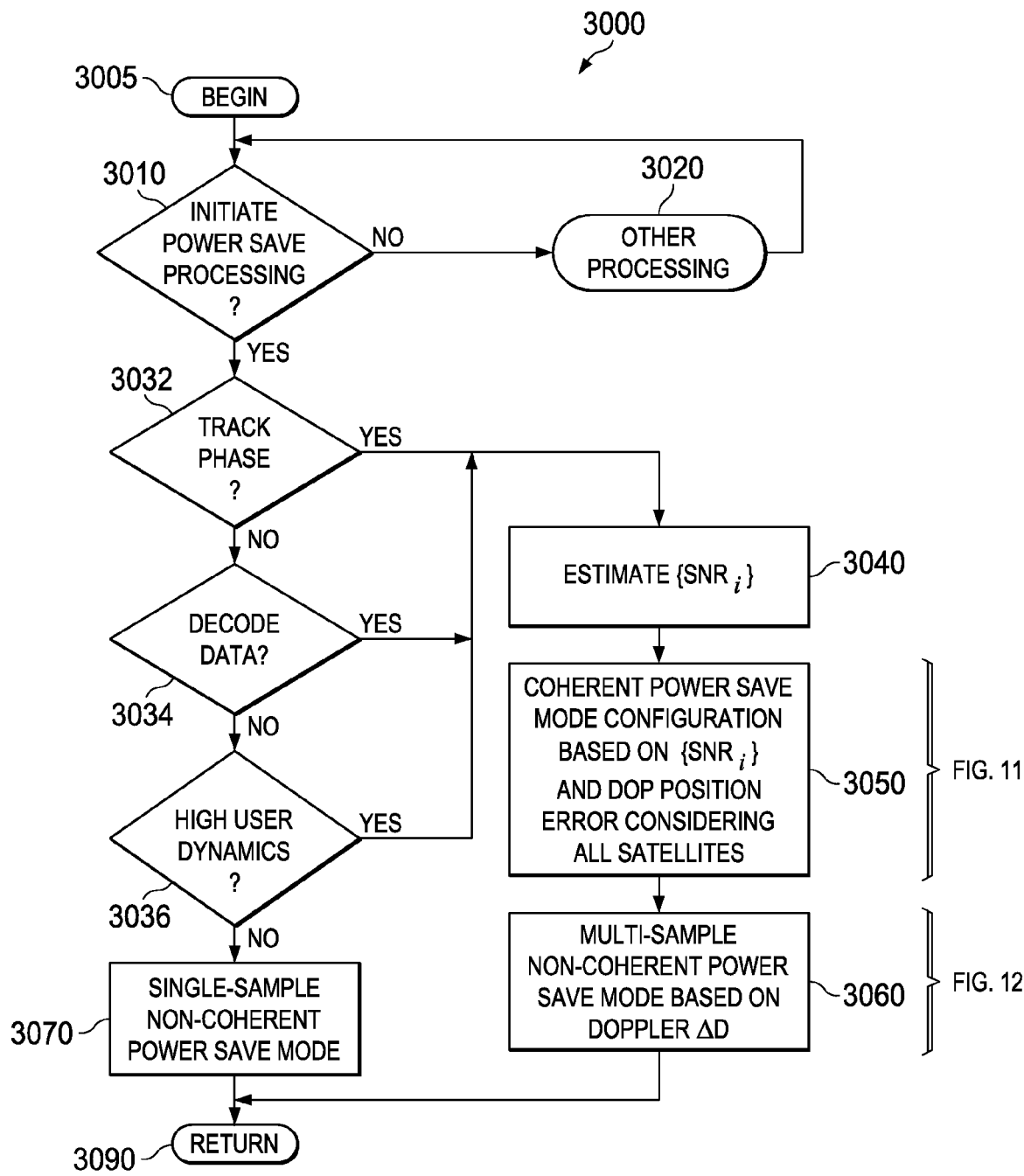
FIG. 10 is a flow diagram of an inventive process of determining and executing different inventive power saving modes of FIG. 6A.

In FIG. 10, operations 3000 of power save mode controller 2130 (2290) commence with a BEGIN 3005 and proceed to determine in a step 3010 whether configuration and/or SNR permit initiation of power save processing. If not, operations branch to Other Processing 3020, e.g., with full-on (20,50) reception, and occasionally check to determine whether conditions have changed by looping back to step 3010. If instead, step 3010 determines that power save processing is to be initiated, then operations go to a composite decision step involving decision criteria 3032 whether phase tracking is needed, 3034 whether data is to be decoded, 3036 whether high user dynamics exists or is likely. These decision criteria are Yes/No evaluated based on type of application or sub-application information APP from MPU 2190, position engine 2270, and/or MPU 2370. Information from position 12C sensor block 2390 and/or BSP Front end 2170 is used or also used in some embodiments here.

If any of the decision criteria 3032, 3034 or 3036 is met, then operations proceed to a step 3040 to acquire satellites SVi and estimate their respective SNRi. In FIG. 10, an estimate of carrier-to-noise ratio C/No is used as one of a number of possible alternatives to the estimate of SNR in some embodiments. Carrier-to-noise ratio C/No and signal to noise ratio SNR are closely related. If any such alternative is used, then it is substituted for SNR or otherwise appropriately handled in the process illustrations FIG. 10, 11, 11A. The alternative estimates can be more or less monotonically increasing or decreasing functions of SNR. For instance, bit error rate BER is an alternative to SNR in FIGS. 10 and 11, and BER is generally a monotonically decreasing function as SNR increases, see discussion of FIG. 8A.

After step 3040, a step 3050 detailed in FIG. 11 establishes Coherent Power Save Mode configuration and determines the appropriate duty cycle based on the set of SNRi (set is {SNRi}), and determines the DOP or position error considering all satellites or an appropriate subset of them determined by the procedure. The SNRi values are obtained from the RF front end 2100 of FIGS. 1 and 2 and/or BSP Front end 2170, for instance.

Figure 12:
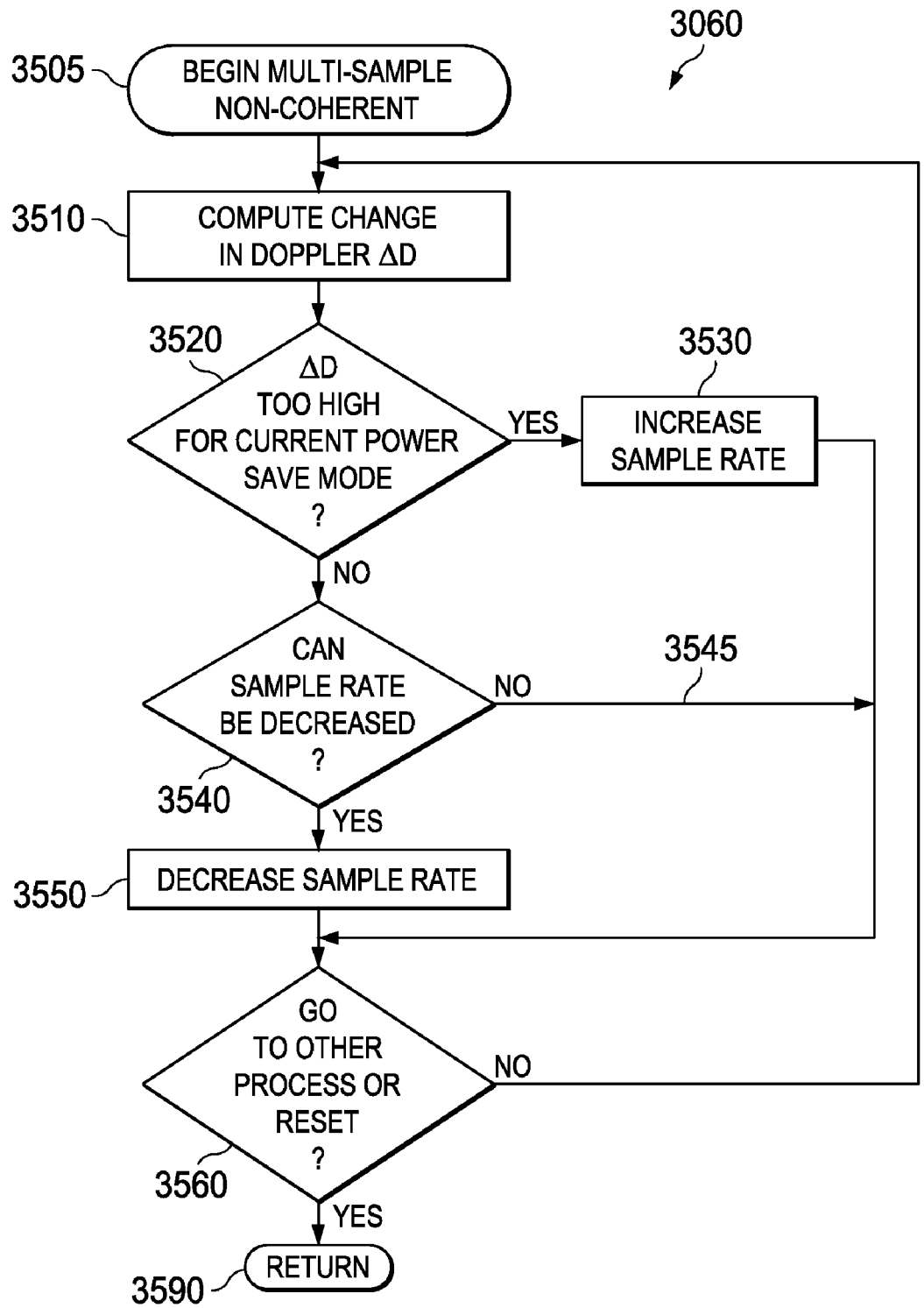
FIG. 12 is a flow diagram of an inventive Multi-sample Non-coherent power saving mode for an AD receiver, such as for FIG. 10.

After step 3050 of FIG. 10, operations go to a step 3060 detailed in FIG. 12 to determine whether phase tracking 3032 or high user dynamics 3036 are involved. In either case 3032 or 3036, operations of step 3060 establish a Multi-Sample Non-coherent Power Save Mode such as 2520 of FIG. 6A based on Doppler change $\Delta D$ as shown in FIG. 12 and FIG. 6A. (Or Coherent Power Save Mode of FIG. 4C is initially turned on here.) If there is sufficient SNR, then a Hybrid mode like 2560 in FIG. 6A is selected to further save power. If data needs to be decoded (Yes at 3034), then step 3060 may in that case be bypassed after step 3050 is executed in some embodiments. The control circuit for the power save mode controller 2130 (2290) thus has an input for a signal representative of a data decoding mode, and the control circuit has a bypass to provide a continual enable for the power control signal during data decoding for the established rate to continue for gating coherent summations.

If instead, none of the decision criteria 3032, 3034 or 3036 is met, then operations go from decision criteria and 3036 to a step 3070 to establish Single-Sample Non-coherent Power Save mode 2510 (FIG. 6A) in power save mode controller 2130 (2290). After either step 3070 or 3060, a RETURN 3090 is reached. The configurations and configuration parameters are provided and adjusted periodically when they depend on run-time measurements or changes in user preferences. The adjustments are suitably made, for instance, upon entry into a given block 3000, 3050, 3060, or 3070.

In an alternative embodiment that revises FIG. 10, the steps 3032, 3034, 3036, and 3070 are eliminated and the Yes path from step 3010 goes directly to step 3040, and then executes steps 3050, 3060 as described above.

In FIG. 11, a process 3200 is provided as an example of an implementation for step 3050 of FIG. 10. Process 3200 in FIG. 11 commences with a step 3210 for Coherent Power Save Configuration and BEGIN. Parameters are established in step 3210 as follows. $N_{min}$ is the minimum number of satellite vehicles (SV) needed for location determination. In a satellite receiver, this minimum number $N_{min}$ may be four, i.e. four satellites to solve the navigation equations for the four unknowns (three of position, with one time error). Some receivers or applications may call for $N_{min}=5$ satellites for a faster convergence to a solution. In some mixed systems, the receiver has auxiliary position sensor(s) such as an accelerometer (e.g., micro-electromechanical sensor (MEMS) or an inertial navigation unit), and/or cellular triangulation receiver or otherwise. In a mixed system, the number $N_{min}$ may be reduced to a fewer minimum number of satellites for solution to suitable equations provided in, and applicable to, the particular mixed system.

Another parameter $k_{max}$ is the largest number of SNRs that are chosen in the process, and $k_{max}$ is less than or equal (=<) to the number of satellite vehicles $N_{SV}$ that are currently acquired by the receiver. Parameter $k_{init}$ is the initializing value of index k that is established with its value less than or equal (<=) to $k_{max}$, and parameter $k_{init}$ is greater than or equal (>=) to parameter $N_{min}$. Next, a step 3215 initializes a rank index k to initializing value $k_{init}$ (compare index k with FIG. 9B rank k).

A step 3220 ranks the set {SNRi} of SNRs of acquired satellite vehicles into the rank ordering (SNR$_1$, SNR$_2$, ... SNR$_k$, ... SNR$_{NSv}$) wherein SNR$_1$ is the highest SNR with rank one (1), etc. and SNR$_{Nsv}$ is the lowest SNR with rank $N_{SV}$ which is the number of acquired satellite vehicles. A decision step 3225 determines whether the number of acquired satellite vehicles Nsv exceeds the minimum number $N_{min}$ needed for location determination (e.g., 4). If not, operations branch to a step 3230 to configure receiver 2200 for a full power coherent and noncoherent summations in FIG. 7, i.e. $T_{off}=0$, $T_{on}=$full 20 ms coherent summation period, and noncoherent summation power-on period 2512 of FIG. 6A occupies the full non-coherent summation interval for satellite acquisition. This establishes maximum signal-to-noise ratio for satellite acquisition performed in succeeding step 3235. After step 3235, a return 3295 is reached and operations in due course begin again at step 3210.

In FIG. 11, if the number of acquired satellite vehicles Nsv is sufficient (YES) in step 3225, then operations enter a loop 3240 and proceed to a step 3245 therein to compute the Dilution of Precision DOP(k). The DOP(k) function used in FIG. 11 is an estimate of the DOP using the signals from satellites corresponding to the k largest SNRs. DOP means dilution of precision, which is a GPS-related concept inversely related to positioning accuracy, and in various embodiments any of a variety of procedures are useful for computing DOP or a variant that is either inversely or directly related to positioning accuracy to some degree.

After DOP(k) computation step 3245, a decision step 3250 determines whether DOP(k) is less than a DOP threshold parameter value DOP$_{Th}$. (The DOP threshold is illustrated by the DOP line in FIG. 9B.) If so (Yes), there is at least adequate precision, and operations proceed to assess whether fewer satellite signals can be used. Operations go to a step 3255 and compute DOP(k−1), the Dilution of Precision based on the k−1 number of satellite signals having highest SNR. After step 3255, a decision step 3260 determines whether DOP(k−1) is also less than the DOP threshold DOP$_{Th}$. If k−1<$N_{min}$, then DOP(k−1) returns a high value (as if infinity) that is higher than any DOP value with which that high value is ever compared. If Yes at 3260, then operations branch to decrement index k to have the value k−1 at a step 3265 and operations go back to step 3245 at the beginning of the loop 3240. If No at step 3260, or after looping until Index k has been sufficiently decremented whereupon No occurs at step 3260, operations leave the loop 3240 and go to a step 3280 described a little later hereinbelow.

If step 3250 determines (No) that DOP(k) is not less than DOP threshold $DOP_{Th}$, then operations proceed to assess whether more satellite signals can be used. Operations branch from step 3250 to a decision step 3270 that determines whether index k equals the parameter $k_{max}$ representing the largest permissible value configured in step 3210 for index k. If No at decision step 3270, then operations branch to a step 3275 to increment the index k by unity and return to DOP(k) step 3245 at the beginning of loop 3240. In this way, the loop 3240 as a whole dynamically finds the least number of highest-SNR satellites that deliver DOP(k) less than the DOP threshold $DOP_{Th}$.

Note that judicious selection of the initial index $k_{init}$ can reduce internal loop 3240 executions around path 3245, 3250, 3270, 3275 and around path 3245, 3250, 3255, 3260, 3265. Some embodiments set the initial index $k_{init}$ to five (or to $k_{max}$ if $k_{max}$ is less than five). Some other embodiments have the host MPU 2370 store a record of numbers k of satellites used in step 3285 over an extended time, and configure or adjust the initial index $k_{init}$ to equal or approximate the average or median of the stored numbers k over the extended time.

If Yes at decision step 3270, then operations proceed to exit Loop 3240 and go to step 3280. Note that if index k=$k_{max}$, i.e., Yes at decision step 3270 of FIG. 11, the flow of FIG. 11 accepts a DOP(k) that equals or exceeds DOP threshold $DOP_{Th}$. This approach is used in some embodiments because it utilizes the satellite resources currently available to the receiver 2200 to determine a current position. Also, when DOP(k) is high, the $T_{OFF}$ value computed in FIG. 11A will be relatively small so that the receiver is operated sensitively or so the receiver can search and acquire more satellites. Other embodiments also insert further decision processing in step 3270. If index k=$k_{max}$ and obtaining a position at the current instant is urgent, then operations still go to step 3280. Urgency of obtaining a position is indicated by high measured velocity exceeding a velocity threshold or urgency is indicated by application configuration or otherwise. However, in cases where index k=$k_{max}$ and obtaining a position at the current instant is not urgent, then operations instead branch to steps 3230 and 3235 to acquire more satellites.

In FIG. 11, step 3280 records a value $SNR_{EST}$ as the minimum SNR of the selected satellites. That minimum SNR is SNR(k) or $SNR_k$, meaning the kth value in the rank ordering ($SNR_1$, $SNR_2$ ... $SNR_k$, ... $SNR_{Nsv}$) determined earlier in step 3220. The step 3285 configures receiver 2200 to use and process signals from the number k of satellites with the k highest SNRs. (In some embodiments wherein receiver hardware has hardware sub-blocks for a maximum number of different acquired satellites and some sub-blocks are unused when a lower number of satellites are acquired, the unused sub-blocks are placed in a low-power, retention, sleep, or off state by Power Save Mode Controller 2130 (2290).) In this way the power save mode control circuit 2130 (2290) operates with a number Nsv of received signals, and power save mode control circuit dynamically controls the receiver circuit to extract a fewer number k of the received signals, unless conditions make k=$N_{SV}$. Then operations determine coherent summation OFF-time $T_{off}$ by executing a step 3290. An example of such determination operations for step 3290 is detailed in FIG. 11A. After step 3290 in FIG. 11 operations reach RETURN 3295.

In FIG. 11, an alternative process uses the following parameters $$K_{max}=N_{SV}, N_{min}=N_{SV}, \text{ and } K_{init}=N_{SV}$$

and executes $$SNR_{extra}=\min(SNR_i)-SNR_{TH}(\text{threshold SNR}).$$

With those parameters, DOP does not need to be computed at all, and some embodiments suitably omit or bypass the loop 3240 of FIG. 11 to implement this simplified process of establishing $T_{OFF}$.

Some embodiments alternatively compute and search the DOP data by dropping and replacing satellite information one at a time from the set of acquired satellites $k_{max}$=$N_{SV}$ and computing the DOP increase equal to DOP(Set k)−DOP(Set k−1). The dropped satellite that increases DOP least is left out to obtain an optimum Set k−1, provided the DOP threshold still exceeds DOP(Set k−1). This process loops until an optimum set of satellites is obtained. Then $SNR_{EST}$ is determined as the minimum SNR of any satellite in the optimum set. This type of embodiment recognizes that DOP is not a function solely of SNR (see Scenario 3) but also of satellite positions relative to each other and the receiver. Also, the DOP in some cases is a function only of satellite positions as discussed in connection with FIG. 8B. Then the optimum set can sometimes eliminate power for channel processing for one or more satellites without reducing $SNR_{EST}$ (the minimum SNR of the selected satellites in the optimum set). In a further alternative embodiment, the process begins by using the four satellites having the highest SNR to constitute a Set 1, and then builds up a minimum set based on DOP calculations. Yet other alternatives use exhaustive search of subsets of the satellites to find an optimum set. In some embodiments that use separate hardware blocks to process signals from respective satellites, the Power Save Mode Controller 2130 (2290) removes power from the hardware blocks for dropped satellites and leaves hardware blocks for selected satellites powered respectively. In embodiments in which a smaller set of satellites are selected and processed by a microprocessor, the application runs to completion more quickly and also saves energy.

Establishing $T_{OFF}$ may involve an assumed future. Some embodiments estimate trends in mean SNR over a time window (e.g., in a range of a minute to an hour) and/or SNR variability (e.g., standard deviation stddev) in the SNRs in the time window. An estimated minimum SNRi is extrapolated along the slope of a trend line of observed SNRs over the time window or otherwise calculated as a predicted SNR using trend information. An example wherein variability is involved establishes $$SNR_{EST}=\text{mean}(\min(SNRi))-c_1\text{stddev}(\min SNRi).$$

Here, parameter value $c_1$ is selected by experiment and is suitably set in the range 0-2 (zero to two) and other values may also be feasible. In this way, power saving mode is controllably maintained at the same or less duty cycle, or perhaps with somewhat higher duty cycle as a precaution against losing satellite information during signal fading such as in some geographies, terrains, forests or urban areas.

FIG. 11A details an example of operations for FIG. 11 step 3290 to determine coherent summation OFF-time $T_{off}$ of FIG. 5A or time 2620 of FIG. 6B. In FIG. 11A, operations commence with a BEGIN 3305 and proceed to a step 3310 to zero-initialize $T_{OFF}$=0. Then a step 3320 determines excess or extra SNR, designated $SNR_{EXTRA}$. The extra SNR is equal to the excess of the lowest SNR, designated $SNR_{EST}$ of FIG.

11 step 3280, of a selected satellite after subtracting the SNR threshold $T_h$ for acceptable bit error rate BER for data reception in FIG. 8A or other SNR threshold for tracking phase, user kinematics or otherwise pertinent to determining the SNR threshold.

In FIG. 11A, after step 3320, a laddered determination of coherent summation OFF-time $T_{off}$ is performed. A decision step 3330, for example, determines whether $SNR_{EXTRA}$ exceeds a top ladder level such as 6 dB. If so (Yes in step 3330), operations branch to a step 3340 and establish a high amount of power saving in the coherent processing by setting $T_{OFF}$=15 ms (power off for ¾ of the 20 ms coherent processing period, or 25% duty cycle). If No in decision step 3330, operations proceed to another decision step 3350 that determines whether $SNR_{EXTRA}$ exceeds a next-lower ladder level such as 3 dB. If so (Yes in step 3350), operations branch to a step 3360 and establish a next-lower amount of power saving in the coherent processing by setting $T_{OFF}$=10 ms (power off for half of the 20 ms coherent processing period, or 50% duty cycle). If No in decision step 3350, operations proceed to another decision step 3350.1 (not shown) if desired, etc., or simply leave the initialized $T_{OFF}$=0 in place from step 3310. RETURN 3390 is reached from any of the steps 3340, 3360 or 3350.

The particular process flow depicted in FIG. 11A represents one of many possible embodiments to generate off-time $T_{OFF}$. Some embodiments utilize additional decision steps to generate more possible levels of $T_{OFF}$. Some other embodiments employ a process operating according to the following equation or a variant thereof:

$$T_{OFF} = RNDD[N*(1-10^{\wedge}(-SNR_{extra}/10))],$$

where RNDD means round down to nearest integer, N is the maximum available number of milliseconds (e.g., 20) in a coherent summation interval, *means multiply, ^ means raise to a power, $SNR_{extra}$ is in units of decibels dB, and $T_{OFF}$ is in units of milliseconds.

To a reasonable approximation, the above equation establishes a duty cycle $D_C$ for on-time inside the coherent summations time interval as a function of SNR. The duty cycle is expressed by $D_C=1-T_{OFF}/N \sim = 10^{\wedge}(-SNR_{extra}/10)$. The fraction of a power control cycle during the maximum available coherent summation period (e.g. N milliseconds, or 20 ms.) is $T_{OFF}/N \sim = 1-10^{\wedge}(SNR_{extra}/10)$, or basically one minus the duty cycle.

The $T_{OFF}$ equation above solves the defining relationship $SNR_{extra}=10 \log_{10}(N)-10 \log_{10}(N-T_{OFF})$. This defining relationship is alternatively solved at any desired fewer number of specified ladder levels of SNR extra for corresponding ladder levels of $T_{OFF}$ by also using the solution equation for $T_{OFF}$.

Here, as $SNR_{extra}$ increases, time $T_{OFF}$ increases in steps, i.e., step-wise, and plateaus near 20 ms. Thus the control circuit determines an off-time for the power control signal as a generally increasing function of at least one of the SNRs. Still other embodiments dynamically establish power saving patterns or modes as depicted in FIG. 5B or FIG. 6A or otherwise.

Some embodiments vary $T_{OFF}$ over time by an SNR extrapolation or projection based on SNR trend information. The extrapolated or projected SNR as a function of time is substituted into the $T_{OFF}$ calculation of FIG. 11A to obtain a function of time for $T_{OFF}$ that is used to control the duty cycle of a power save mode over the amount of time thereafter to which the extrapolation or projection pertains.

In FIG. 12, an embodiment has example operations for implementing step 3060 of FIG. 10. The power control circuit dynamically operates to determine a number of multiple intervals in the e.g., one-second noncoherent summations period as a function of Doppler difference over time. Put another way, the circuit responds to an input for Doppler difference and adjusts the lower power save modulating frequency (e.g., 1 Hz rate or more) as a function of the Doppler difference. The control circuitry enables power gating circuitry to gate power for noncoherent summations at that power save modulating rate.

In FIG. 12, operations 3505 configure Multi-Sample Non-coherent mode and then BEGIN. Then a step 3510 computes changing Doppler rate or Doppler difference $\Delta D$ such as from BSP Front end 2170 or RF Front end 2100 or otherwise. Operations in receiver 2200 are in some embodiments configured so that Doppler D itself and Doppler difference $\Delta D$ are measured each time the power save mode controller 2130 (2290) powers enough circuitry on to permit the measurements.

For example, let Doppler D be measured at least every second. A decision step 3520 determines whether the Doppler difference $\Delta D$ from second to second exceeds a first threshold parameter value DDTH1 configured in step 3505 for a current power save mode like non-coherent power save mode 2510 of FIG. 6A or FIG. 4B. If so (Yes at 3520), operations branch to a step 3530 to change the power save mode to a Multi-Sample Non-coherent mode 2540. If operations are already in mode 2540, then operations of step 3530 increase the sample rate of the power save mode to have the sample rate of FIG. 6A power save mode 2520.

Some embodiments at step 3530 also apply a $T_{OFF}$ computation using a process flow of FIG. 11A. Such $T_{OFF}$ process can increase $T_{OFF}$ interval 2620 and use coherent summations duty cycling of hybrid mode 2560 in FIGS. 6A, 6B to save more power while holding SNR about the same. In other words, increasing the sample rate at step 3530 can increase SNR by powering more non-coherent summations each second. But also using the FIG. 11A process flow in step 3530 can increase $T_{OFF}$ and reduce SNR by an amount that compensates for the SNR increase from the increased sampling, with the result that SNR is held approximately constant.

In FIG. 12 after step 3530, a decision step 3560 goes to a return 3590 to execute or continue executing a current user application. In case the operations of FIG. 12 process 3060 are iterative, then operations loop back from step 3560 to step 3510. If an overriding reason to reset occurs, then operations go to a warm reset.

In FIG. 12, if the Doppler difference $\Delta D$ in step 3520 is below the first threshold parameter value DDTH1 for the current power save mode, then operations proceed (No) to a decision step 3540 that determines whether the sample rate can be decreased. Decision step 3540 determines whether the Doppler difference $\Delta D$ from step 3510 is instead below a second threshold parameter value DDTH2 that was also configured in earlier step 3505 for the current power save mode. The second threshold parameter value DDTH2 for decision step 3540 is lower than the first threshold parameter value DDTH1 used in decision step 3520. The first and second threshold parameter values DDTH1 and DDTH2 are either computed from a specified value of accuracy specified for a given application (e.g., positioning), or iteratively determined automatically or by experiment to achieve an application-specific level of accuracy. If No in decision step 3540, the Doppler difference $\Delta D$ is between the first and second threshold parameter values DDTH1 and DDTH2, no change of noncoherent power mode sample rate of FIG. 6A is needed, and flow passes along a path 3545 to a step 3560. If Yes in decision step 3540, then the Doppler difference $\Delta D$ is insufficient to justify current rate of taking Doppler measurements, i.e., less than DDTH2, and operations proceed to a step 3550 to decrease the noncoherent power mode sample rate in FIG. 6A reversely to the description of step 3530. Some embodiments also apply the FIG. 11A process flow in step 3550 to reduce $T_{OFF}$ and compensate for the SNR lost by reducing the sample rate in step 3550, with the result that SNR is held approximately constant. After step 3550 or path 3545 or step 3530, operations at decision step 3560 determine whether to go to another process or reset receiver 2220. If so, operations reach RETURN 3590, and otherwise operations loop back to step 3510 to continue Doppler difference-based power save mode control operations of FIG. 12.

Power save flags and signals are derived in FIGS. 10-12 for lines 2295 of FIG. 3A, for controls, handshaking, monitoring and diagnostic purposes in various embodiments. An overall power flag is set or reset depending on whether decision step 3010 of FIG. 10 is Yes or No. Respective mode flags or codes are delivered by any of: steps 3050, 3060, 3070 of FIG. 10; steps 3210, 3230 and 3235 of FIG. 11; and steps 3505, 3530, 3545, 3550 of FIG. 12. Real time digital waveforms of any of FIGS. 4B, 4C, 5A, 5B, 6A, 6B are in some embodiments provided on a line among lines 2295 for noncoherent and coherent and hybrid power save mode flags.

Some embodiments impress the duty cycle inside a period of summations for Fast Fourier Transform receiver processing or other transforms for processing.

Notice that a portion of description herein involves power saving mode control when the receiver is performing spread spectrum reception or otherwise, and power management processing with a power duty cycle impressed using a power waveform in a frequency range of about 0.1 Hertz to 10,000 Hertz (10 KHz), and in some examples in a frequency range of about 50 Hertz (20 ms. cycle period) to 500 Hz (2 ms. cycle period). Notice that some embodiments at sufficiently high SNR provide a yet-further level of power management by subdividing the 1 ms GPS coherent summation interval and impressing a power-saving duty cycle at a frequency in the range 500 Hz (2 ms. cycle period) to 10,000 Hertz (10 KHz, 0.1 ms. cycle period). In some such embodiments, the entire PN sequence is autocorrelated in the receiver to acquire the transmission, and then a transition is made to the higher frequency power save mode when SNR is sufficiently high to permit it. Impressing the duty cycle inside the PN sequence is especially useful when the duty cycle-selected portions of the PN sequences of plural concurrently received transmissions are orthogonal to each other. In other words, the PN sequences are constructed so duty-cycle-selected PN sequence portions of them can be orthogonal as well as the entire received PN sequences being orthogonal to each other.

Some embodiments, such as in FIG. 13, combine such power saving mode control above 0.1 Hertz with power save operations that occur substantially below 0.1 Hertz (sleep/wake either periodically or on-demand or otherwise non-deterministically) wherein the satellite receiver is asleep for substantial periods of time and time keeping is performed by a cellular engine at least when the satellite receiver is asleep. Then the cellular engine provides correct time keyed to a TIMESTAMP strobe as in FIG. 13 when the satellite receiver wakes up, so that the satellite receiver then operates with a shorter time to first position fix (TTFF). For more description of the latter subject, the US patent application TI-38194 "Satellite (GPS) Assisted Clock Apparatus, Circuits, Systems and Processes for Cellular Terminals on Asynchronous Networks," Ser. No. 11/844,006, filed Aug. 23, 2007, is incorporated by reference herein in its entirety.

Figure 13:
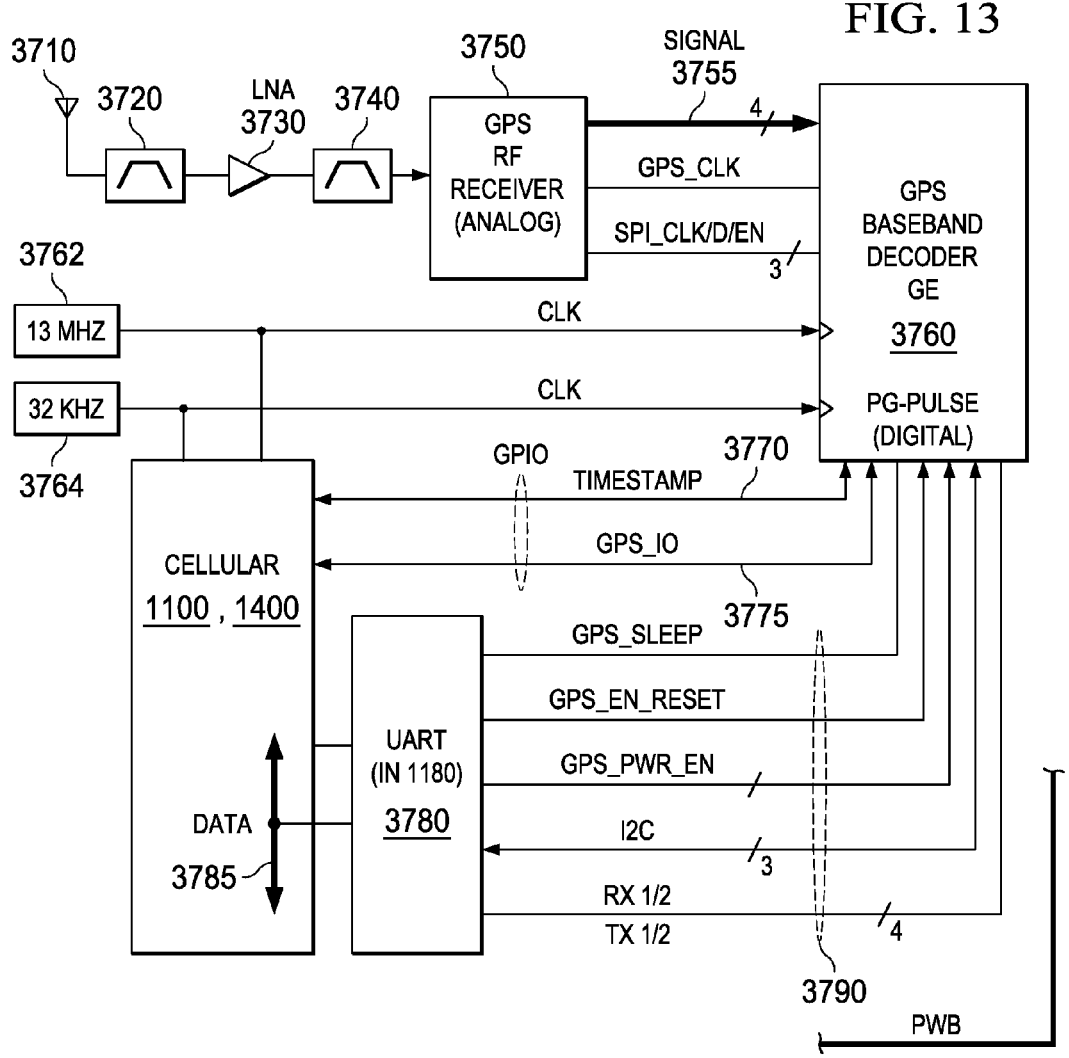
FIG. 13 is a block diagram of an inventive system including a satellite positioning engine or GPS AD receiver coupled with a processor integrated circuit for cellular communications and for timekeeping when the GPS receiver is asleep.

In FIG. 13, an embodiment is improved over, and is combined with, the technology of said Ser. No. 11/844,006 incorporated US patent application (TI-38194) according to the teachings herein. In FIG. 13, GPS unit 1190 (1495) of FIGS. 16-17 has an antenna 3710 for reception of satellite positioning signals. Antenna 3710 is coupled to a bandpass filter 3720 followed by a low noise receiver amplifier LNA 3730 followed by another bandpass filter 3740. A GPS RF section 3750 is provided as an analog or mixed-signal integrated circuit fed from bandpass filter 3740. RF section 3750 in turn supplies signals to a digital GPS baseband decoder 3760 integrated circuit in the GPS receiver. Integrated circuit 3760 includes a power save mode controller like 2130 (2290) as described elsewhere herein, see FIGS. 1-3B and FIGS. 10-12. RF section 3750 supplies signal output lines 3755 to the GPS baseband decoder 3760. Lines for SPI (serial port interface) clock, data, and enable and a further GPS clock line connect receiver 3750 and GPS baseband decoder 3760 and couple power management controls from decoder 3760 power save mode controller 2130 to RF section 3750 as shown in FIGS. 1 and 2.

GPS baseband decoder 3760 utilizes an accumulate-and-dump AD satellite positioning process for supplying GPS information or other satellite positioning information. GPS baseband decoder 3760 is coupled to integrated circuit 1100 (or 1400) of FIG. 17 by lines TIMESTAMP 3770 and GPS_IO 3775. Processor integrated circuit 1100 (or 1400) as used for timekeeping herein is suitably provided as a processor in hardware, or in hardware combined with software or in hardware combined with firmware associated with, and/or integrated into, a communications modem including digital baseband DBB 1100, analog baseband ABB 1200 and RF transmitter/receiver TX/RX 1300 of FIG. 17. In FIG. 13, Cellular communications circuitry acts as a cellular engine CE for processing time information derived from the cellular communications network. Processor 1100 (or 1400) is coupled by a UART 3780 in interfaces 1180 of FIG. 17 to control the integrated circuit having GPS baseband decoder 3760.

Accordingly, a data bus 3785 in processor 1100 provides controls and data as parallel bits to the UART 3780 and these bits are supplied on particular lines in a set of lines 3790 to control the GPS Engine GE. For example, these lines convey control inputs to GPS baseband decoder 3760 including a GPS_SLEEP input, a soft enable/reset GPS_EN_RESET, and a power up enable GPS_PWR_EN. These control lines pertain to the less-than-0.1 Hz. power-save control in GPS baseband decoder 3760 combined into an energy efficient time-accurate overall system embodiment with high-rate coherent power save mode (e.g., FIG. 4C, 5A) introduced into GPS baseband decoder 3760. Further lines to GPS baseband decoder 3760 from UART 3780 include three I2C interface lines for bi-directional serial communication, and two pairs of lines TX1, RX1 and TX2, RX2 for communication directed to GPS baseband decoder 3760 on the RX1, RX2 lines and for communication to UART 3780 on the TX1, TX2 lines. The I2C interface suitably carries power save flags and other power management information from lines 2295, and carries MPU APP information in FIG. 3A, between the CE 1100 (1400) and GE 3760 in FIG. 13 according to the teachings herein.

In FIG. 13, a first clock 3762 has a frequency illustratively between 10 and 100 MHz or higher, that during reception is continually (or selectively) locked to or synchronized with clocks present in cellular base stations or other network base stations. Between receptions the first clock (e.g., 13 MHz) is switched off or is left to run depending on the operating mode.

The first clock 3762 benefits from correction by the cellular network and the reciprocal of the frequency of the first clock 3762 is in range 0.1-0.01 ppm or less. The particular frequencies and ppm numbers are utilized to describe embodiments without limitation as to other embodiments.

Some embodiments introduce a second clock 3764 with a lower frequency, e.g., below 1 MHz. such as at 32 KHz). The second clock 3764 is on and operative between receptions when the first clock 3762 is turned off for power saving. Processing circuitry 1100 (or 1400) is coupled to the cellular modem and to the first clock 3762 and second clock 3764 and to GPS baseband decoder 3760. Thus, relatively-accurate subsequent global time is determined and maintained as a sum of products and ratios of time intervals and counter values representing numbers n of clock beats according to a relation $$t_{CT} = t_0 + [n_1 + (n_2/RCP0) + n_3(X_{RTC}/RCP0)]T_{cellular}$$

where $t_0$ is a first GPS global time at a time-of-arrival cellular signal (TIMESTAMP), $t_{CT}$ is the relatively-accurate subsequent global time from time projection, $T_{cellular}$ is the time interval between time of arrival signals from a cellular network, RCPO is number of first clock 3762 counts in the time interval $T_{cellular}$, $X_{RTC}$ is number of first clock 3762 counts between cycles of second clock 3764, $n_1$ is a number of received instances of the time interval $T_{cellular}$, $n_2$ is the number of first clock counts distinct from periods counted with $n_1$, and $n_3$ is the number of second clock 3764 periods distinct from periods counted with $n_1$ and $n_2$.

When GPS blocks 3750, 3760 wake up, the relatively-accurate time $t_{CT}$ is then used to update GPS receiver local time that leads to time parameters $t_{Rj}$ in the GPS navigation equations and facilitate faster time to first fix (TTFF) by GPS baseband decoder 3760.

Figure 14:
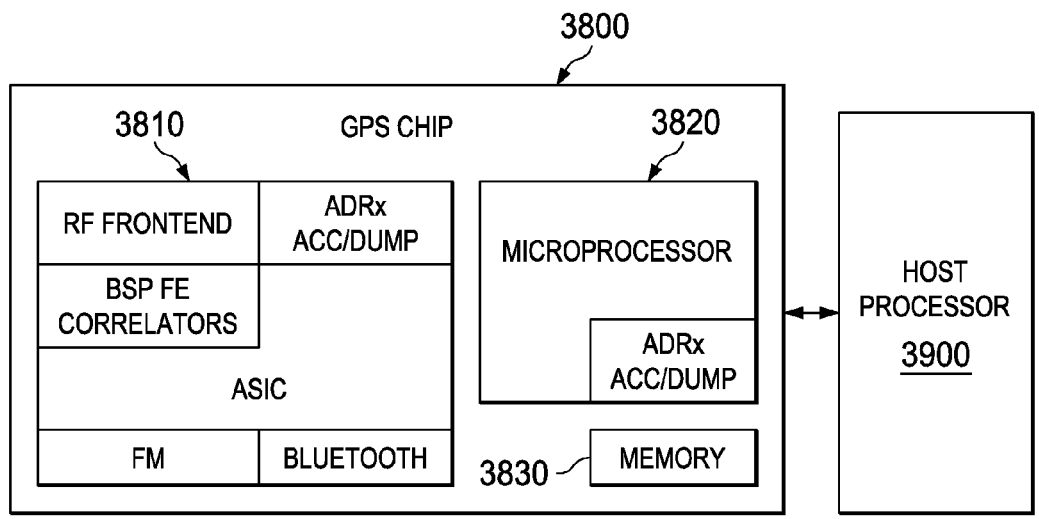
FIG. 14 is a chip layout for inventive integrated circuit chips with different functional blocks of an inventive AD receiver manufactured thereon and coupled to a host processor.

FIG. 14 illustrates an example of chip partitioning for operations in a system embodiment using the description herein. A satellite receiver GPS chip 3800 has a first core 3810 including a block for RF Front end; a block for BSP Front end FE, Correlators, a block for ADRx accumulate-and-dump ACC/DUMP Receiving (Rx), an ASIC block for Power-Save Mode Controller and other receiver and Rx control circuitry, and a frequency management FM block. A Bluetooth short distance wireless block on-chip interfaces to headset and/or display peripherals, and it also interfaces to control peripherals in some robotic and other system embodiments. A second core 3820 includes a microprocessor MPU with functional logic and local memory for more of ADRx accumulate-and-dump ACC/DUMP Rx and navigation/Doppler solutions. A memory area 3830 provides storage for cores 3810 and 3820. A host processor chip 3900 is coupled by a bus with satellite receiver GPS chip 3800. The layout of FIG. 14 is applied as shown and/or combined into FIGS. 3B, 13 and/or 17.

In some embodiments, a portion of the block 3820 of FIG. 14 has counters/decoders/registers 2350 of FIG. 3B that remain powered during $T_{OFF}$ interval 2620 and off-intervals like 2514 in FIG. 6A that establish the duty cycles for power-save modes herein, and that keep time for symbol runs in FIG. 4A, 9C. The microprocessor MPU in FIG. 14 runs the power save mode control operations of FIG. 10-12 out of firmware or software; and if MPU is not otherwise needed, then MPU is put to sleep to save power. The MPU delivers and saves results of its power save mode control operations into the registers of the counters/decoders/registers which run autonomously unless and until changed by MPU when power is on to the MPU. Thus, some embodiments use very little extra chip real estate to implement power save mode controller 2130 (2290) by largely reusing other parts such as MPU. Put another way, the hardware of Power Save Mode Controller 2130 (2290) is in some embodiments a master block having operations from FIGS. 10-12 in it, and some other embodiments it is slaved to a microprocessor that executes the operations of FIGS. 10-12. A Master/Slave distinction is used here in the sense of relative allocation of functions that pertain to selecting and configuring the power save mode.

Figure 15:
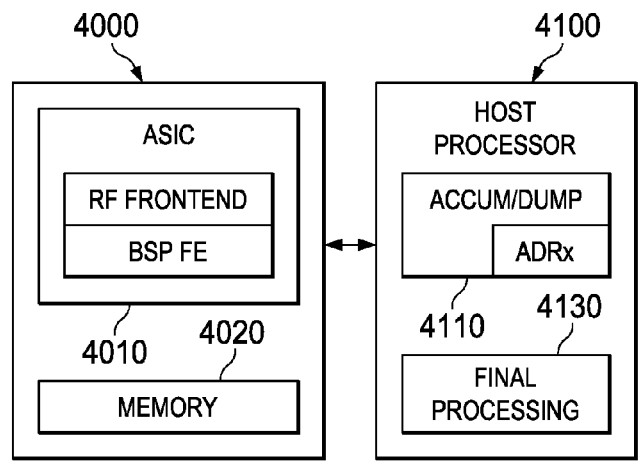
FIG. 15 is another chip layout for inventive integrated circuit chips with different functional blocks of an inventive receiver manufactured on an ASIC chip and coupled to a host processor chip having AD functionality.

FIG. 15 illustrates another example of chip partitioning for operations in a system embodiment using the description herein. A first chip 4000 has an ASIC block 4010 that implements an RF Front end and BSP front end for the satellite receiver. A memory area 4020 is situated on-chip and coupled with ASIC block 4010. A host processor chip 4100 includes a microprocessor with functional circuitry 4110 for ADRx accumulate-and-dump ACC/DUMP Rx, as well as a block 4130 for final processing. The layout of FIG. 15 is applied as shown and/or combined into FIGS. 3B, 13 and/or 17.

Figure 16:
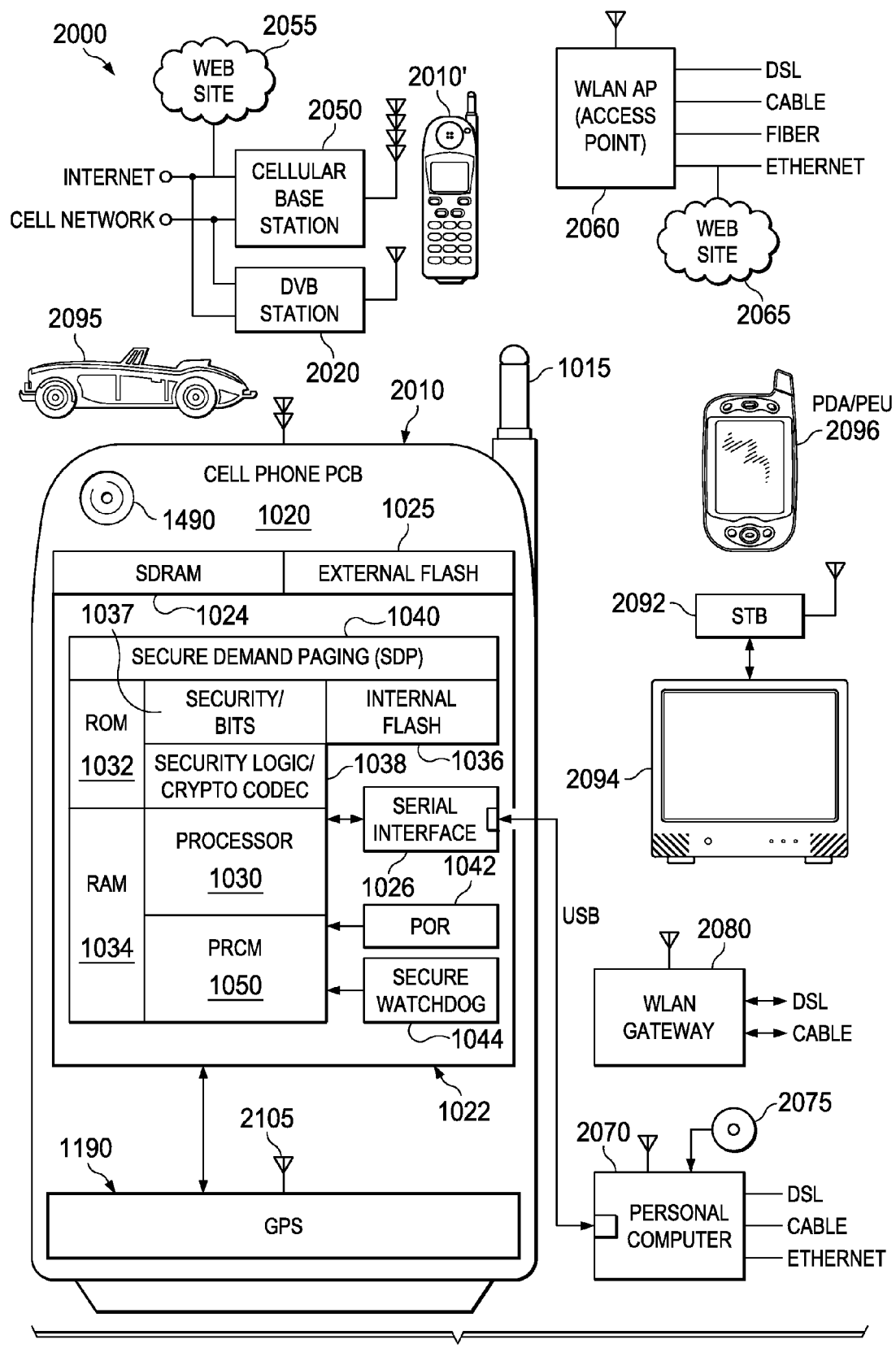
FIG. 16 is a pictorial diagram of an inventive communications system including inventive system blocks herein, for example a cellular base station, a DVB video station, a WLAN AP (wireless local area network access point), a WLAN gateway, a personal computer, a set top box and television unit, and two cellular telephone handsets; and any one, some or all of the foregoing improved according to the invention.

In FIG. 16, an improved communications system 2000 has system blocks as described next and improved with any one, some or all of the circuits and subsystems shown in FIGS. 1-17 herein and suitably made by a manufacturing process such as in FIG. 18. Any or all of the system blocks, such as cellular mobile telephone and data handsets 2010 and 2010', digital video broadcast DVB station 2020, a cellular (telephony and data) base station 2050, a WLAN AP (wireless local area network access point, IEEE 802.11 unlicensed mobile application UMA, or otherwise) 2060, a Voice over WLAN gateway 2080 with user voice over packet telephone 2085 (not shown), and a voice enabled personal computer (PC) 2070 with another user voice over packet telephone (not shown), communicate with each other in communications system 2000. Each of the system blocks 2010, 2010', 2050, 2060, 2070, 2080 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), Ethernet wideband network, and other methods. Cellular base station 2050 two-way communicates with the handsets 2010, 2010', with the Internet, with cellular communications networks and with PSTN (public switched telephone network). In some embodiments the base station 2050 is part of a multiple input-multiple output MIMO communications system, such as one having four base station transmission antennas and with receiver having two receiving antennas as illustrated.

In this way, advanced networking capability for services, software, and content, such as cellular telephony and data, position-based applications, user real-time kinematics, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), medical-related services, and other services accommodates and provides security for secure utilization and entertainment appropriate to the just-listed and other particular applications.

Embodiments of applications and system blocks disclosed herein are suitably implemented in fixed, portable, mobile, automotive 2095, seaborne, and airborne, communications, control, set top box 2092, television 2094 (receiver or two-way TV), and other apparatus. The personal computer (PC) 2070 is suitably implemented in any form factor such as desktop, laptop, palmtop, organizer, mobile phone handset, PDA personal digital assistant 2096, internet appliance, wearable computer, content player, personal area network, or other type and usable with media 2075 such as optical disk, flash drive, and other media.

For example, handset 2010 is improved for selectively determinable functionality, performance, low power consumption, security and economy when manufactured. Handset 2010 is interoperable and able to communicate with all other similarly improved and unimproved system blocks of communications system 2000. An accelerometer and tilt sensor integrated circuit block(s) is provided. Camera 1490 provides video pickup. Together with Camera 1490, the accelerometer and tilt sensor support integrated positioning and user real-time kinematics applications integrated with GPS 1190 for cell phone 2010. Cell phone 2010 has physical layer interfaces to send information over the internet to cell phone 2010', PDA 2096, TV 2094, and to a monitor of PC 2070 via any one, some or all of cellular base station 2050, DVB station 2020, WLAN AP 2060, STB 2092, and WLAN gateway 2080. Handset 2010 has a voice storage, such as hard drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 2070 and magnetic, semiconductor and/or optical media 2075 when the user desires and for reception of software intercommunication and updating of information between the personal computer 2070 (or other originating sources like camera or camcorder external to the handset 2010) and the handset 2010. Such intercommunication and updating also suitably occur via any other processor in the cell phone 2010 itself such as for GPS positioning, cellular modem, WLAN, Bluetooth, a website 2055 or 2065, or other circuitry for wireless or wireline modem processor, digital television and physical layer (PHY).

In FIG. 16, processor integrated circuit 1022 is coupled to a satellite positioning integrated circuit 1190 for GPS or otherwise. The GPS circuit 1190 has an antenna 2105. The processor integrated circuit 1022 includes at least one processor MPU (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030.

ROM 1032 provides a boot storage having boot code that is executable in at least one type of boot sequence. One or more of RAM 1034, internal flash 1036, and external flash 1025 are also suitably used to supplement ROM 1032 for boot storage purposes. A Secure Demand Paging system 1040 effectively expands the size of secure memory in RAM 1034 to include part or all of SDRAM 1024. At least one Power, Resets, and Control Manager 1050 establishes power management for processor integrated circuit 1022.

FIG. 17 illustrates inventive integrated circuit chips including chips 1100, 1200, 1300, 1400, 1500, and GPS 1190 (1495) for use in any one, some or all of the blocks of the communications system 2000 of FIG. 16. The skilled worker uses and adapts the integrated circuits to the particular parts of the communications system 2000 as appropriate to the functions intended. For conciseness of description, the integrated circuits are described with particular reference to use of all of them in the cellular telephone handsets 2010 and 2010' by way of example.

It is contemplated that the skilled worker uses each of the integrated circuits shown in FIG. 17, or such selection from the complement of blocks therein provided into appropriate other integrated circuit chips, or provided into one single integrated circuit chip, in a manner optimally combined or partitioned between the chips, to the extent needed by any of the applications supported by the DVB station 2020, cellular telephone base station 2050, personal computer(s) 2070 equipped with WLAN, WLAN access point 2060 and Voice WLAN gateway 2080, as well as cellular telephones, radios and televisions, Internet audio/video content players, fixed and portable entertainment units, video phones, routers, pagers, personal digital assistants (PDA), organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages.

In FIG. 17, an integrated circuit 1100 includes a digital baseband (DBB) block that has a RISC processor 1105 (such as MIPS core(s), ARM core(s), or other suitable processor) and a digital signal processor 1110 such as from the TMS320C55x™ DSP generation from Texas Instruments Incorporated or other digital signal processor (or DSP core) 1110, communications software and security software for any such processor or core, security accelerators 1140, and a memory controller. Security accelerators 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1105 and 1110 for providing sequences of software instructions and data thereto. A security logic circuit 1038 of FIGS. 16 and 17 has a secure state machine (SSM) to provide hardware monitoring of any tampering with security features. A Secure Demand Paging (SDP) circuit 1040 is provided for effectively-extended secure memory.

Digital circuitry 1150 on integrated circuit 1100 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1×EV-DV, 1×EV-DO or 3×EV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Blocks for uplink and downlink processes of WCDMA are provided.

Audio/voice block 1170 supports audio and voice functions and interfacing. Speech/voice codec(s) and speech recognition are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 2070. The serial interface includes UARTs (universal asynchronous receiver/transmitter circuit) for performing the conversion of data between parallel and serial lines. A power resets and control module PRCM 1185 provides power management circuitry for chip 1100. Chip 1100 is coupled to location-determining circuitry 1190 satellite positioning such as GPS (Global Positioning System) and/or to a network-based positioning (triangulation) system, to an accelerometer, to a tilt sensor, and/or other peripherals to support positioning, position-based applications, user real-time kinematics-based applications, and other such applications. Chip 1100 is also coupled to a USIM (UMTS Subscriber Identity Module) 1195 or other SIM for user insertion of an identifying plastic card, or other storage element, or for sensing biometric information to identify the user and activate features.

In FIG. 17, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1×EV-DV, 1×EV-DO or 3×EV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to an audio/voice codec 1170 and a stereo DAC (digital to analog converter) for a signal path to the baseband block 1210 and with suitable encryption/decryption.

A control interface 1230 has a primary host interface (I/F) and a secondary host interface to DBB-related integrated circuit 1100 of FIG. 17 for the respective GSM and CDMA paths. The integrated circuit 1200 is also interfaced to an I2C port of applications processor chip 1400 of FIG. 17. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine between the power conversion block 1240 and circuits 1250. Power management circuitry PRCM 1185 (1470) is coupled with and controls power conversion block 1240 and interfaces to GPS 1190 (1495) and to power save mode controller 2130 (2290) in systems of FIGS. 1-3B and as described elsewhere herein.

Circuits 1250 provide oscillator circuitry for clocking chip 1200. The oscillators have frequencies determined by one or more crystals 1290. One or more of the oscillators are suitably controlled and stabilized for precise VCXO (variable control crystal oscillator) timekeeping as discussed elsewhere herein and in incorporated patent application Ser. No. 11/844,006 (TI-38194). Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine. Battery monitoring is provided by either or both of 1-Wire and/or an interface called HDQ.

In FIG. 17 an RF integrated circuit 1300 includes a GSM/GPRS/EDGE/UMTS/CDMA RF transmitter block 1310 supported by oscillator circuitry with crystal(s) 1290. Transmitter block 1310 is fed by basebands block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA basebands block 1210.

Further in FIG. 17, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller MEM CTRL 1426 with DMA (direct memory access), and a 2D (two-dimensional display) graphic accelerator. Speech/voice codec/speech recognition functionality is suitably processed in chip 1400, in chip 1100, or both chips 1400 and 1100.

The RISC processor 1422 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, a shared memory controller 1426 in circuitry 1420 interfaces the RISC processor 1420 and the DSP 1424 via an on-chip bus to on-chip memory 1440 with RAM and ROM. A 2D graphic accelerator is coupled to frame buffer internal SRAM (static random access memory) in block 1440. A security block 1450 includes an SSM analogous to SSM 1038 of FIG. 1, and includes secure hardware accelerators having security features and provided for secure demand paging 1040 and for accelerating encryption and decryption. A random number generator RNG is provided in security block 1450.

On-chip peripherals and additional interfaces 1410 include UART data interface and MCSI (Multi-Channel Serial Interface) voice wireless interface for an off-chip IEEE 802.15 (Bluetooth and low and high rate piconet and personal network communications) wireless circuit 1430. Debug messaging and serial interfacing are also available through the UART. A JTAG emulation interface couples to an off-chip emulator Debugger for test and debug. GPS 1190 (1495) is scannable by the debugger, see FIG. 2. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls and data to position unit GPS 1495 and otherwise, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller (or coupling to 1260), and audio amplifier 1480 to stereo speakers.

External audio content and touch screen (in/out) 1260, 1266 and LCD (liquid crystal display), organic semiconductor display, and DLP™ digital light processor display from Texas Instruments Incorporated, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display 2095 of FIG. 16 is provided on one or more windows of a vehicle and wirelessly or wireline-coupled to the video feed. Maps and visual position-based interactive imaging and user kinematics applications are provided using GPS 1190 (1495) and processor 1105, 1110 (1422, 1424) for fixed, portable, mobile, vehicular and other platforms.

Interface 1410 additionally has an on-chip USB OTG interface that couples to off-chip Host and Client devices. These USB communications are suitably directed outside handset 2010 such as to PC 2070 (personal computer) and/or from PC 2070 to update the handset 2010 or to a camera 1490.

An on-chip UART/IrDA (infrared data) interface in interfaces 1410 couples to off-chip GPS (global positioning system of block 1495 cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 17, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

On chip 1400, a power, resets, and control module PRCM 1470 supervises and controls power consuming blocks and sequences them, and coordinates with PRCM 1185 on chip 1100 and with Power Save Mode Controller 2130 (2290) in GPS 1495 as described elsewhere herein.

In FIG. 17, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems, and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has low noise amplifier LNA in the receive path. Bandpass filtering couples WLAN RF 1540 to a WLAN antenna 1545. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 17. In some embodiments, GPS 1495 operates in close coordination with any one, some, or all of WLAN, WiMax, DVB, or other network, to provide positioning, position-based, and user real-time kinematics applications.

Still other additional wireless interfaces such as for wideband wireless such as IEEE 802.16 WiMAX mesh networking and other standards are suitably provided and coupled to the applications processor integrated circuit 1400 and other processors in the system. WiMax has MAC and PHY processes and the illustration of blocks 1510 and 1520 for WLAN indicates the relative positions of the MAC and PHY blocks for WiMax.

In some embodiments, any one, some, or all of WLAN network time base, WiMax, DVB, or other network time base, and/or internal crystal-controlled time base is used instead of or in addition to the cellular network time base to do precision time keeping when GPS 1190 (1495) and/or cellular modem 1100 is powered and/or unpowered, all according to or based on the teachings elsewhere herein.

In FIG. 17, a further digital video integrated circuit 1610 is coupled with a television antenna 1615 (and/or coupling circuitry to share antenna 1015 and/or 1545 and/or 2105) to provide television antenna tuning, antenna selection, filtering, RF input stage for recovering video/audio/controls from television transmitter (e.g., DVB station 2020 of FIG. 16). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output 1619 to interfaces 1410 of applications processor chip 1400 either directly from chip 1610 or indirectly from chip 1610 via the ADC on ABB chip 1200. Controls for chip 1610 are provided on lines 1625 from interfaces 1410. Applications processor chip 1400 includes a digital video block 1620 coupled to interface 1410 and having a configurable adjustable shared-memory telecommunications signal processing chain such as Doppler/MPE-FEC. See incorporated patent application TI-62445, "Flexible And Efficient Memory Utilization For High Bandwidth Receivers, Integrated Circuits, Systems, Methods And Processes Of Manufacture" Ser. No. 11/733,831 filed Apr. 11, 2007, which is hereby incorporated herein by reference. A processor on chip 1400 such as RISC processor 1422 and/or DSP 1424 configures, supervises and controls the operations of the digital video block 1620.

In combination with the GPS circuit 1190 and/or 1495, and video display 1266 or LCD, the RISC processor 1105/1422 and/or DSP 1110 (1424) support location-based embodiments and services of various types, such as roadmaps and directions thereon to a destination, pictorials of nearby commercial establishments, offices, and residences of friends, various family supervision applications, position sending to friends or to emergency E911 service, and other location based services now known or yet to be devised. For such services, fast time of position fixing, low system power consumption, and reliability of accurate timekeeping to support position-based services even during power management operations and cellular network base station handover or handoff operations are all desirable for improved technology such as supported by various embodiments herein.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors, and other nanoelectronics and other structures. Photonic integrated circuit blocks, components, and interconnects are also suitably applied in various embodiments.

Figure 18:
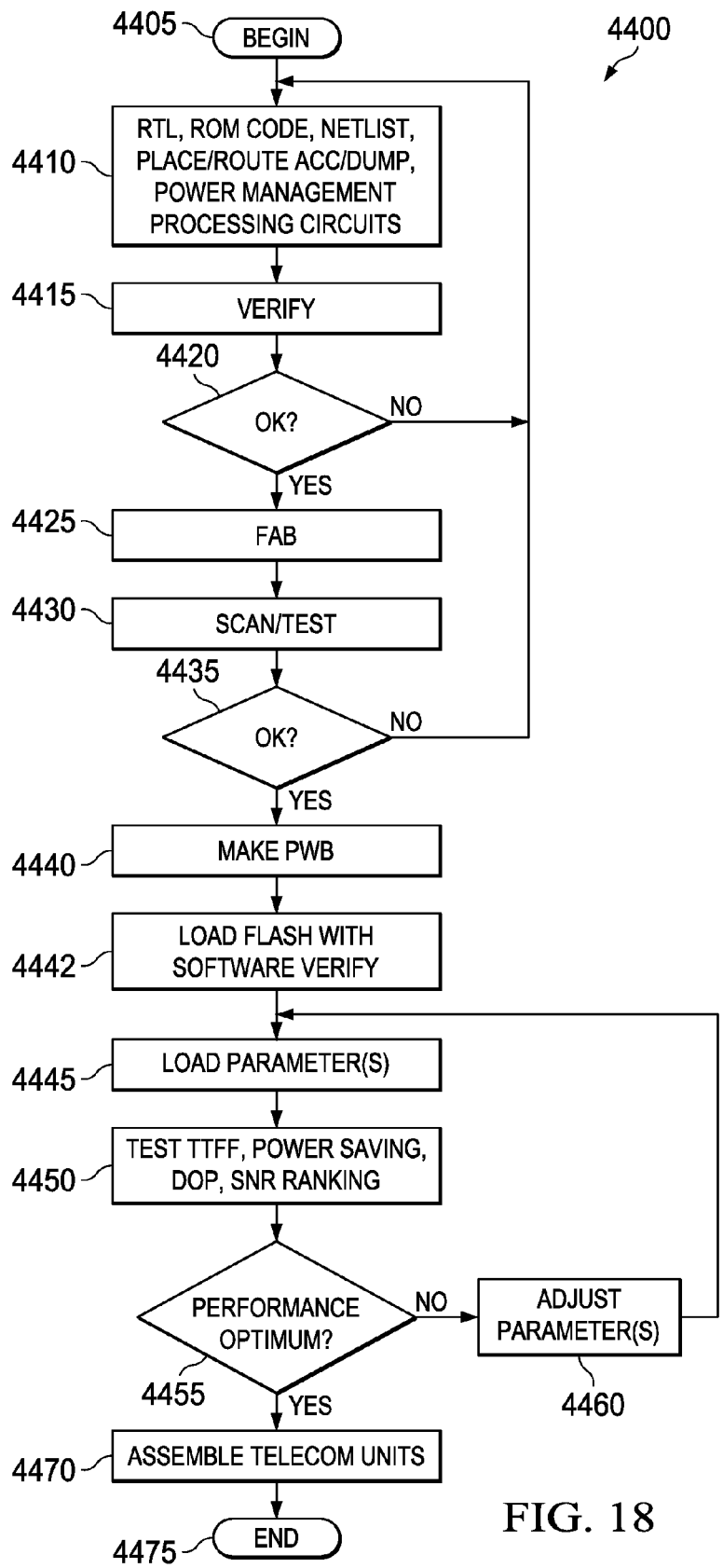
FIG. 18 is a manufacturing process flow diagram for an inventive process of manufacturing power saving electronic circuits and systems such as those in FIGS. 14-17 and other Figures herein.

In FIG. 18, various embodiments of integrated circuit systems and processes as described herein are manufactured according to a suitable process of manufacturing 4400 as illustrated in the flow of FIG. 18. The process begins at step 4405 and a step 4410 prepares RTL (register transfer language) and netlist for a desired embodiment such as one including, or respectively including, a communications unit on one or more integrated circuits, an accumulate and dump receiver and/or spread spectrum receiver with a power save mode controller as described elsewhere herein. The Figures of drawing show some examples of structures, and the detailed description describes those examples and various other alternatives.

In a step 4415, such embodiment is verified in simulation electronically on the RTL and netlist. Place and route operations are performed to establish the physical layout of each integrated circuit, and the layout is verified. In this way, the contents and timing of the memory, of the receivers and processor hardware and of the GPS decoder are verified. The operations are verified pertaining to the desired sequences and parallelism of power saving mode and other operations of the communications unit and the GPS unit as shown in the Figures of drawing herein for an applicable embodiment. Then a verification evaluation step 4420 determines whether the verification results are currently satisfactory. If not, operations loop back to step 4410.

If verification evaluation 4420 is satisfactory, the verified design of each communications receiver with master or slave power save mode controller is fabricated in a wafer fab and packaged to produce each resulting integrated circuit(s) at step 4425 manufactured according to the verified design(s). Then a step 4430 verifies the operations directly on first-silicon and production samples such as by using scan chain and tracing methodology on the circuits to confirm that actual operation is in accordance with the expected operation of the verified design(s). Testing and verification of the power saving mode or process is performed by loading mode parameters and monitoring the duty cycle and power management frequency in which the receiver components are operating to establish that each power saving mode is operating correctly. Related counter circuitry and controlled blocks are checked for proper operation. An evaluation decision step 4435 determines whether the chips are satisfactory, and if not satisfactory, the operations loop back as early in the process as needed such as step 4415 or 4410 to get satisfactory integrated circuits.

In FIG. 18, when the integrated circuits are satisfactory in step 4435, a telecommunications unit based on teachings herein is manufactured. This part of the process prepares in a step 4440 a particular design and printed wiring board (PWB) of a system embodiment using the integrated circuit(s). The particular design of the printed wiring board PWB of FIG. 13 is tested in a step 4440 by electronic simulation and prototyped and tested in actual application. In a step 4442, software is loaded into flash memory for the system and verified. Operational parameters are loaded in a step 4445 to flash memory 1025 and configure the system. Operational parameters include one or more power saving duty cycle parameters and power saving mode controller configurations, and characteristics of GPS and cellular networks loaded into flash memory or other non-volatile memory. Operational parameters suitably include any one or more of the following: power save mode identification codes, counter values to establish power management $T_{on}$, $T_{off}$, $T_{rest}$ for applicable blocks; various FIG. 11 parameters $k_{init}$, $N_{min}$, $k_{max}$, $DOP_{Th}$; SNR threshold $T_h$ of FIG. 1A; and parameters in FIG. 12 such as Doppler difference first and second thresholds DDTH1, DDTH2 and specified power mode sample rates for FIG. 12. A user interface such as including keypad, map display, and/or microphone of FIG. 17, is coupled to the microprocessor.

The system is powered up in step 4445 and power saving mode parameters and other configuration and operational parameter(s) are boot loaded or run-time loaded in the system in step 4445. A step 4450 tests the running system for proper power saving mode selection and duty cycling of coherent and multi-sample noncoherent receiver operations, amount of power dissipation, correct SNR ranking, DOP computation if any, $T_{OFF}$ determination, proper multi-sampling power save operation in high Doppler change environments, length of time to position fix TTFF, energy consumption, system operational efficiency and accuracy of kinematic and other measurements, application execution time, reported user experience, and other pertinent metrics.

A decision step 4455 may determine that further increased efficiency or performance is called for. Then revision or adjustment of the software and/or parameter(s) is performed in a step 4460 for higher system operational efficiency, faster application execution, lower power dissipation, greater accuracy, and other pertinent metrics. Then operations loop back from step 4460 to reload the software at step 4442, reload the parameter(s) at step 4445 and do further testing at step 4450. When the testing is satisfactory at step 4450 and 4455, operations proceed to step 4470.

In a manufacturing step 4470, a signed certificate with the embedded software and configuration and operational parameters for the positioning system is loaded into the Flash non-volatile memory 1025 (1435) of FIG. 17 or embedded on-chip into one or more blocks of FIGS. 1-3B, 13-17. The system is mass-produced. Operations are completed at END 4475.

A few preferred embodiments have been described in detail hereinabove. It is to be understood that the scope of the invention comprehends embodiments different from those described, as well as described embodiments, yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams and block diagrams herein are representative of flows and/or structures for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An electronic circuit comprising
a receiver circuit operable to perform coherent summations having a coherent summations time interval; and
a power control circuit coupled to said receiver circuit and operable to impress a power controlling duty cycle on the receiver circuit inside the coherent summations time interval.

2. The electronic circuit claimed in claim 1 wherein said receiver circuit also is operable to perform non-coherent summations of the coherent summations and said power control circuit is concurrently operable to impress a power management control longer than the coherent summations time interval, on both the coherent summations and the non-coherent summations.

3. The electronic circuit claimed in claim 1 wherein said receiver circuit also is operable to perform non-coherent summations of the coherent summations and the noncoherent summations have a non-coherent summations period and said power control circuit is operable to impress a power management control on the non-coherent summations during multiple intervals in the non-coherent summations period.

4. The electronic circuit claimed in claim 3 wherein said power control circuit is dynamically operable to determine the number of the multiple intervals as a function of Doppler difference over time.

5. The electronic circuit claimed in claim 1 wherein said power control circuit is dynamically operable to determine the duty cycle inside the coherent summations time interval as a function of a signal to noise ratio (SNR).

6. The electronic circuit claimed in claim 5 wherein the duty cycle has a power-off time that stepwise increases with SNR.

7. The electronic circuit claimed in claim 1 wherein said power control circuit determines the duty cycle by a process including rank ordering a plurality of signals by their signal to noise ratios.

8. The electronic circuit claimed in claim 1 operable with a number of received signals wherein said power control circuit is operable to dynamically control said receiver circuit to extract a fewer number of the received signals.

9. The electronic circuit claimed in claim 8 wherein said power control circuit is operable to select the fewer number of received signals based on a dilution of precision test relative to a dilution of precision threshold.

10. The electronic circuit claimed in claim 1 wherein said receiver circuit includes an accumulate and dump circuit.

11. The electronic circuit claimed in claim 1 wherein said receiver circuit includes a despreading circuit operable to despread at least one spread spectrum signal.

12. If the electronic circuit claimed in claim 1 wherein said receiver circuit is selected from the group consisting of 1) receiver circuit for satellite signals, 2) cellular receiver circuit, 3) MIMO receiver circuit, 4) wireless local area network receiver circuit, 5) wireless gateway circuit, 6) base station circuit, 7) medical communication circuit.

13. A telecommunications device comprising
a spread spectrum receiver circuit operable to perform coherent summations having a coherent summations time interval; and
a power control circuit coupled to said receiver circuit and operable to impress a power controlling duty cycle on the spread spectrum receiver circuit inside the coherent summations time interval.

14. The telecommunications device claimed in claim 13 further comprising a position display unit coupled to said spread spectrum receiver circuit and wherein said spread spectrum receiver circuit includes a wireless communications receiving section also coupled to said power control circuit.

15. The telecommunications device claimed in claim 13 wherein said spread spectrum receiver circuit includes multiple channels for receiving satellite signals, and said power control circuit is coupled to control how many of the multiple channels are active.

16. The telecommunications device claimed in claim 13 wherein said spread spectrum receiver circuit includes multiple channels for receiving satellite signals and a processor circuit for executing an application selected from the group comprising 1) position sensing, 2) user kinematics, 3) phase tracking, 4) satellite data decoding, 5) Doppler tracking, 6) attitude sensing, 7) Doppler difference tracking.

17. The telecommunications device claimed in claim 13 wherein said spread spectrum receiver circuit includes a processing circuit and the device further comprises an accelerometer coupled with said processing circuit.

18. The telecommunications device claimed in claim 13 further comprising a cellular communications circuit and wherein said power control circuit is also operable to put said spread spectrum receiver asleep for a period of time, and said cellular communications circuit is operable to perform timekeeping at least when said spread spectrum receiver is asleep and to provide a time update when said spread spectrum receiver wakes up.

19. The telecommunications device claimed in claim 13 wherein said spread spectrum receiver circuit also is operable to perform non-coherent summations of the coherent summations and said power control circuit is concurrently operable to impress a power management control longer than the coherent summations time interval, on both the coherent summations and the non-coherent summations.

* * * * *